(12) United States Patent
Wasyluk et al.

(10) Patent No.: US 9,366,458 B2
(45) Date of Patent: Jun. 14, 2016

(54) SHOP ASSEMBLED VERTICAL SERPENTINE FLOW MOLTEN SALT SOLAR RECEIVER

(75) Inventors: David T. Wasyluk, Mogadore, OH (US); David L. Kraft, Massillon, OH (US); Jason M. Marshall, Wadsworth, OH (US); Steven P. Iannacchione, Jeannette, PA (US); Ruth E. Irwin, legal representative, Jeannette, PA (US)

(73) Assignee: The Babcock & Wilcox Company, Barberton, OH (US)

(*) Notice: Subject to any disclaimer, the term of this patent is extended or adjusted under 35 U.S.C. 154(b) by 260 days.

(21) Appl. No.: 13/560,347

(22) Filed: Jul. 27, 2012

(65) Prior Publication Data

US 2013/0192586 A1    Aug. 1, 2013

Related U.S. Application Data

(60) Provisional application No. 61/513,251, filed on Jul. 29, 2011.

(51) Int. Cl.
| | |
|---|---|
| *F24J 2/10* | (2006.01) |
| *F24J 2/24* | (2006.01) |
| *F24J 2/30* | (2006.01) |
| *F24J 2/34* | (2006.01) |
| *F22B 1/00* | (2006.01) |
| *F24J 2/07* | (2006.01) |
| *F24J 2/46* | (2006.01) |

(52) U.S. Cl.
CPC . *F24J 2/10* (2013.01); *F22B 1/006* (2013.01); *F24J 2/07* (2013.01); *F24J 2/245* (2013.01); *F24J 2/30* (2013.01); *F24J 2/34* (2013.01); *F24J 2/4649* (2013.01); *Y02E 10/41* (2013.01); *Y02E 10/44* (2013.01)

(58) Field of Classification Search
CPC ............ Y02E 10/41; F24J 2/0007; F24J 2/34; F24J 2/10; F24J 2/245; F24J 2/30; F22B 1/006
USPC .............. 126/619, 663, 684, 643, 609; 4/351; 62/285
See application file for complete search history.

(56) References Cited

U.S. PATENT DOCUMENTS

| | | | | |
|---|---|---|---|---|
| 2,882,871 | A * | 4/1959 | Koch | 122/478 |
| 5,694,774 | A * | 12/1997 | Drucker | 60/641.11 |
| 2004/0112374 | A1* | 6/2004 | Litwin | 126/680 |
| 2009/0241939 | A1* | 10/2009 | Heap et al. | 126/645 |
| 2010/0101564 | A1* | 4/2010 | Iannacchione et al. | 126/680 |
| 2010/0101621 | A1* | 4/2010 | Xu | 136/206 |
| 2010/0199976 | A1* | 8/2010 | Plotkin | 126/634 |
| 2010/0242354 | A1* | 9/2010 | Perkins et al. | 44/639 |

FOREIGN PATENT DOCUMENTS

| | | | |
|---|---|---|---|
| WO | WO 2011024647 A1 * | 3/2011 | |
| WO | WO 2010093235 A3 * | 6/2011 | |

* cited by examiner

*Primary Examiner* — Steven B McAllister
*Assistant Examiner* — Rabeeul Zuberi
(74) *Attorney, Agent, or Firm* — Eric Marich

(57) ABSTRACT

A solar receiver is disclosed. The solar receiver is modular, has multiple tube panels in a rectangular/square/polygonal/circular configuration, and is designed for use with molten salt or another heat transfer fluid. The heat transfer fluid flows in a vertical serpentine path through the sides (facets) of the solar receiver. The solar receiver can be shop assembled and can be used with a support tower to form a solar power system.

23 Claims, 19 Drawing Sheets

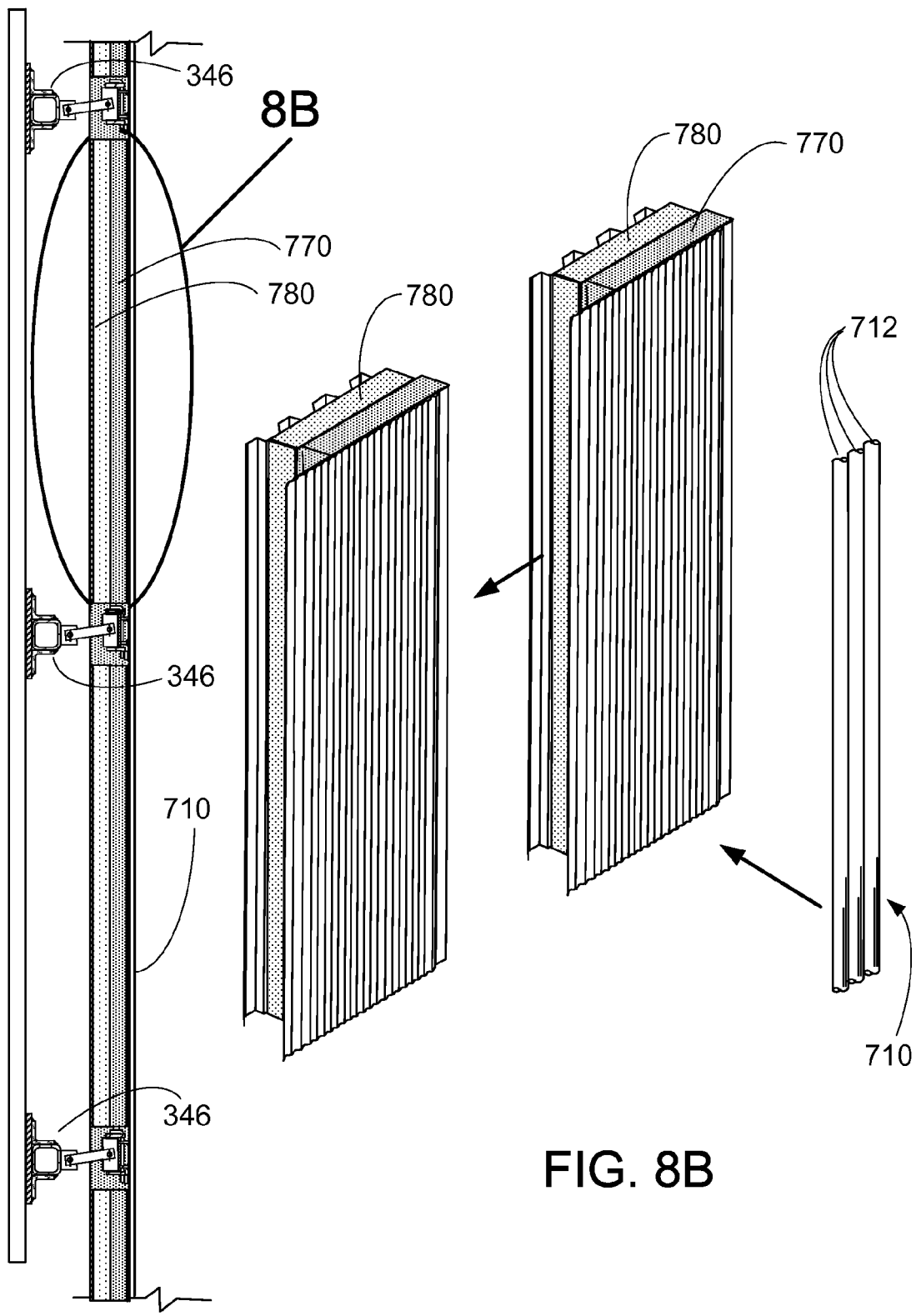

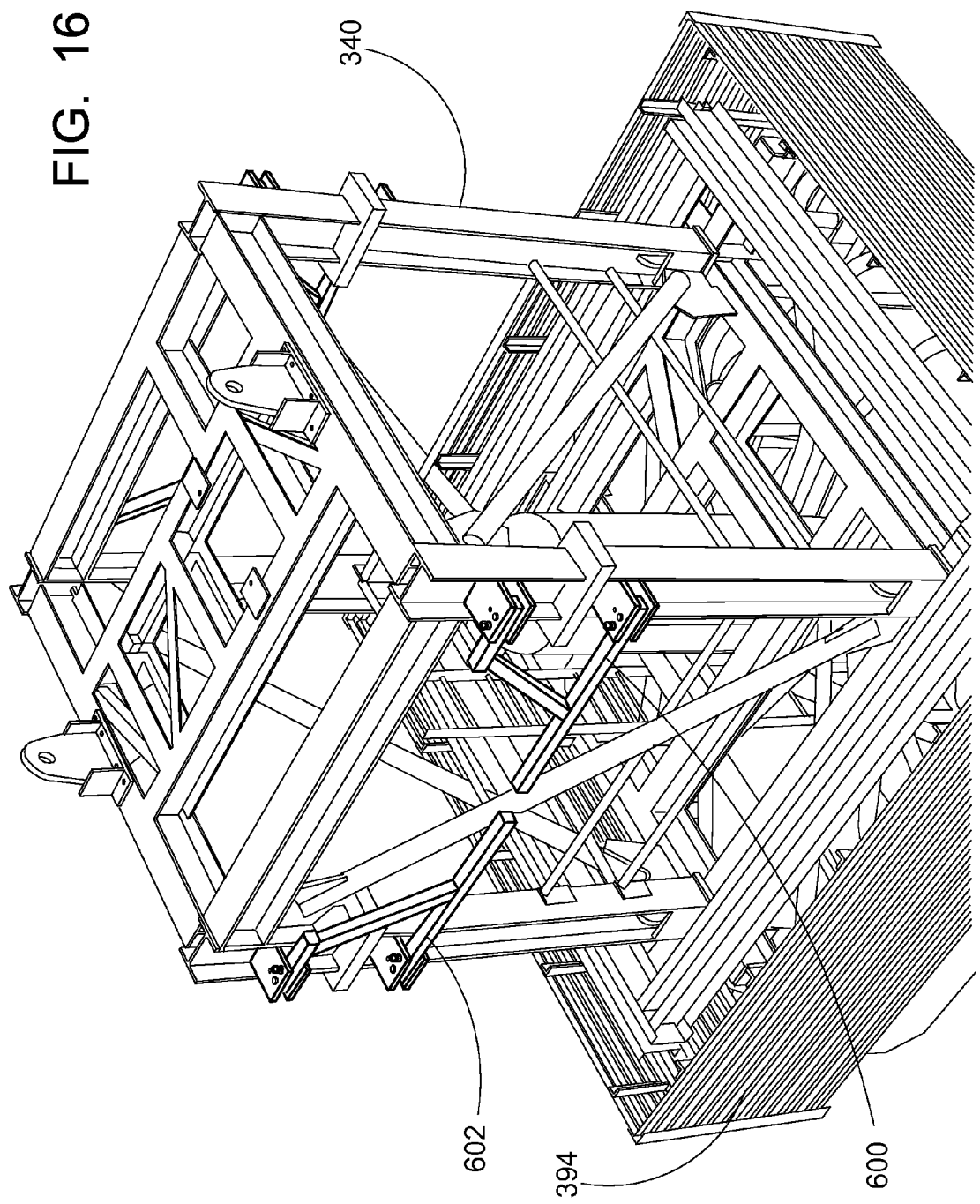

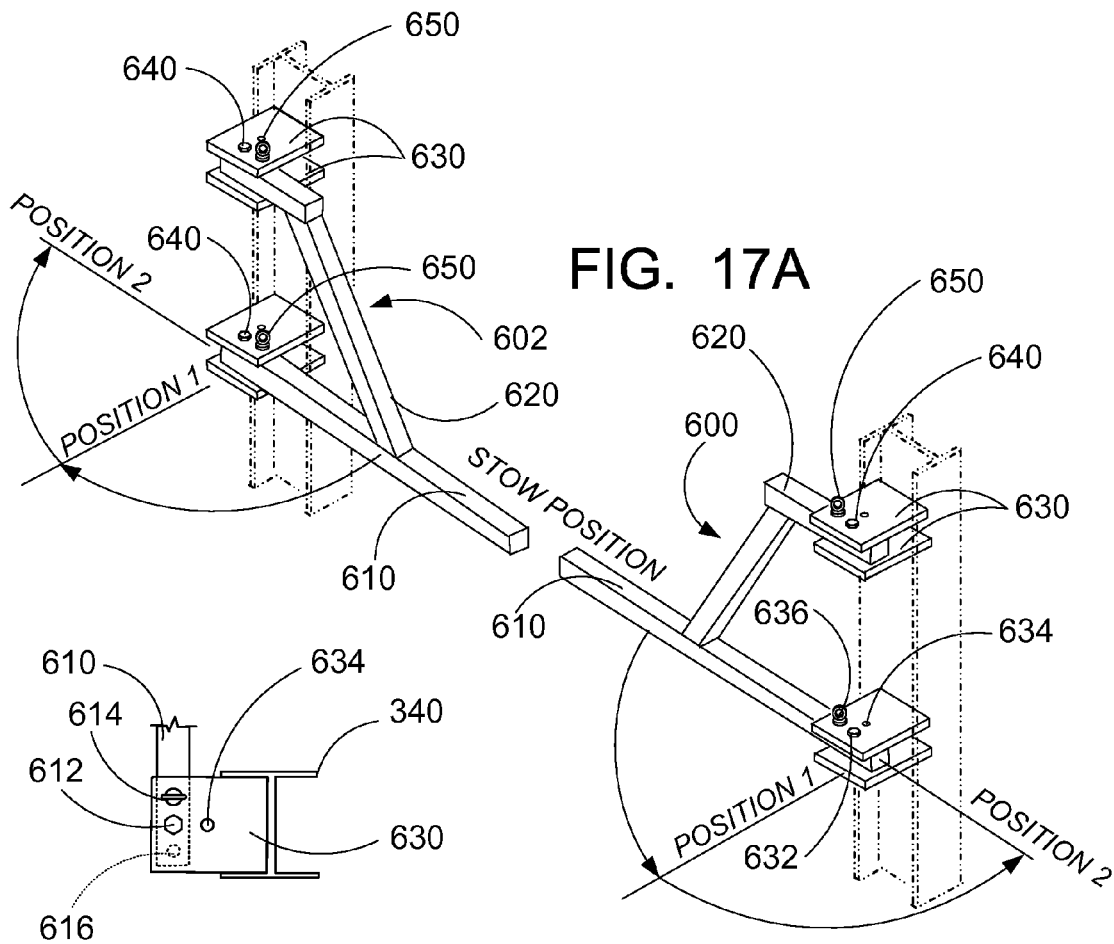
FIG. 17A
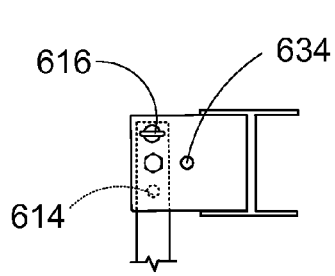
FIG. 17B
STOW POSITION
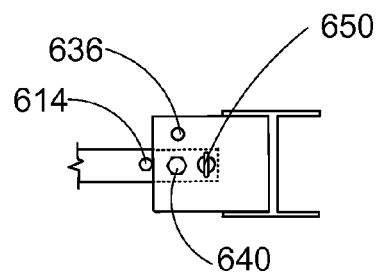
FIG. 17C
POSITION 2
FIG. 17D
POSITION 1

US 9,366,458 B2

SHOP ASSEMBLED VERTICAL SERPENTINE FLOW MOLTEN SALT SOLAR RECEIVER

This application claims priority to U.S. Provisional Patent Application Ser. No. 61/513,251 filed Jul. 29, 2011, the disclosure of which is hereby fully incorporated by reference.

BACKGROUND OF THE INVENTION

The present disclosure relates, broadly, to the field of power generation used to produce electricity. More particularly, the disclosure relates to a modular, shop-assembled solar receiver. The receiver comprises an arrangement of heat transfer surfaces or facets, a molten salt heat transfer system structurally and fluidically interconnected thereto, and an integral support structure, among other components. Also disclosed is a power generation system using such a shop-assembled solar receiver.

Generally, a solar receiver is a component of a solar energy generation system whereby radiation from the sun (i.e. sunlight) is used as a heat source. The radiation and heat energy from the sun is transferred to a working fluid which is used to ultimately generate electricity through the use of turbines, etc. The receiver is usually a large unit permanently mounted on top of an elevated support tower that is strategically positioned in a field of heliostats, or mirrors, that collect rays of sunlight and reflect those rays back to target walls in the receiver. An efficient, compact solar receiver for such systems which uses molten salt or a similar heat transfer fluid and which is simple in design, modular, rugged in construction, and economical to manufacture, ship, and install would be desirable in the field of power generation.

Currently wind and solar photovoltaic power generators do not have economical energy storage capability. Without energy storage, fluctuations on the grid are inevitable due to changing winds, clouds, and darkness at night. As more solar electricity power generators are installed, fluctuations in the grid due to cloud passages and daily start up and shut down will be unacceptable to maintain demand. Ultimately, in order to control the grid, energy storage will be required. Molten salt solar plants with molten salt solar receivers may be helpful to meet this energy storage requirement, which allows for consistent and dispatchable electricity.

Unlike a steam/water solar power plant, a molten salt solar plant is able to efficiently store the collected solar energy as thermal energy, which allows the power generation to be decoupled from the energy collection. The power plant can then produce and dispatch electricity as needed, such as during cloud cover and at night, for some amount of time depending on the thermal storage system size.

A solar power plant that uses steam/water receivers and separately uses molten salt for thermal storage is possible, but less efficient. Additional heat exchangers would be required to transfer the thermal energy from the superheated steam, produced by the receivers, to heat the molten salt. The molten salt could then be stored, and when desired, electricity could be generated by pumping the hot salt to a different system of heat exchangers that transfer the thermal energy from the hot salt to water in order to produce steam to drive a conventional Rankine cycle turbine generator. Some problems with this system include the added cost of additional heat exchangers. Also, it would be difficult to design a steam/water receiver that is capable of producing hot enough steam to fully utilize the high temperature storage capability of the salt. Different heat transfer fluids (HTF) could be used for energy storage, such as oils used with parabolic trough technology, however these HTFs are limited to lower temperatures and are less efficient. Overall solar power plant efficiency would be lost through the additional heat exchangers and temperature limitations of different HTFs.

Along these lines, Gemasolar, a solar power plant located in Spain, utilizes a single, large field-erected molten salt solar receiver and was commissioned in Spring 2011. This project is designed to produce 17 megawatts electric (MWe) with 15 hours of energy storage.

A solar power plant project known as Solar Two was in operation from January 1998 to April 1999. Solar Two was intended to demonstrate the potential use of molten salt solar power tower technology on a commercial scale. FIG. 1 is a perspective drawing of the Solar Two receiver.

The solar receiver used in Solar Two was a single, field-erected receiver in a heliostat field. The receiver consisted of 24 panels in an external cylindrical arrangement surrounding the internal piping, instrumentation, and salt holding vessels (not visible). Each of the panels consisted of 32 thin walled tubes constructed of stainless steel and coated with black paint in order to absorb the maximum amount of incident solar energy from the heliostat field.

FIG. 2 is a schematic of flow paths of the Solar Two receiver. The first flow path is the bypass flow path. "Cold" molten salt could flow up riser 202 and into inlet vessel 210. Upon opening of the bypass valve 208, the molten salt would flow through bypass line 206 directly into downcomer 204, bypassing the panels and the outlet vessel 220. The second flow path flows through the receiver panels to heat up the molten salt. Cold molten salt flowed from inlet vessel 210 through pipe 230 into and through the panels, then flowed into outlet vessel 220. Drain valves 240, ring header 242, and vent valves 244 are also illustrated.

It would be desirable to provide a compact solar receiver that uses molten salt or a similar heat transfer fluid and which is simple in design, modular, and economical.

BRIEF DESCRIPTION

The present disclosure relates to tube panel constructions and solar receivers for energy capture and storage. Preferably, the solar receivers use molten salt as a heat transfer fluid.

The solar receivers are small, modular, and factory assembled, which allows them to be transported easily and minimizes field assembly costs. Multiple units of the modular receivers can be used in a heliostat field. Also included are molten salt solar power systems comprising such modular units. The term "modular" is used herein to mean that the solar receiver is a standardized unit, so that easier and faster scale-up can be obtained by the addition of another such unit.

The shop-assembled solar receivers comprise an arrangement of heat transfer surfaces, a molten salt heat transfer system structurally and functionally interconnected thereto, and a vertical support structure. The vertical support structure supports the heat transfer surfaces and the various components of the molten salt heat transfer system.

The shop-assembled solar receiver uses the energy of the sun to heat the working fluid (i.e. molten salt). A heliostat field of mirrors located on the ground automatically tracks the sun, and reflects and concentrates light energy to the shop-assembled solar receiver. The incident solar insolation heats the working fluid, which can be used with a turbine to generate electricity.

Disclosed in various embodiments is a molten salt solar receiver, comprising multiple heat transfer surfaces/facets. Each facet comprises a facet inlet, a facet outlet, and one or more tube panels. Each tube panel comprises at least one tube, an inlet header, and an outlet header. The multiple facets are arranged on an exterior of a support structure to form a NE flow quadrant, a NW flow quadrant, a SE flow quadrant, and a SW flow quadrant. The tube panels are oriented to locate the headers in an upper plane and a lower plane, the headers in each plane being laterally separated from each other. The facets are fluidly connected so as to form two independent flow paths, one flow path including the NE flow quadrant and the SW flow quadrant, and the other flow path including the NW flow quadrant and the SE flow quadrant. Each tube panel is optionally connected to the support structure by a toggling buckstay support system. The solar receiver may optionally include an upper heat shield, a lower heat shield, a riser pipe, a downcomer pipe, and/or a bypass line connecting the riser pipe to the downcomer pipe. The upper heat shield encloses the headers of the tube panels in the upper plane. The lower heat shield encloses the headers of the tube panels in the lower plane.

The tube panels may be drainable and ventable. The solar receiver can be shop assembled and truck shippable. Other heat transfer fluids could also be used besides molten salt if applicable.

The headers of each tube panel may be inward facing, which decreases the dimensions of the receiver. In particular embodiments, the upper headers and the lower headers of one facet are at a higher elevation than the upper headers and the lower headers of one or both of the adjacent facets. The facets can be arranged in a rectangular, square, polygonal, or circular configuration.

The solar receiver can further comprise an outlet vessel, the outlet vessel being fluidly connected downstream of the tube panels. In particular embodiments, the outlet vessel is located above the multiple facets.

The solar receiver can further comprise an inlet vessel, the inlet vessel being fluidly connected upstream of the facets. The inlet vessel can be located above or below the tube panels, or at the base of the tower.

Each tube panel may be top supported and connected to the support structure along a height of the tube panel by the toggling buckstay support system.

The solar receiver may further comprise a flow control valve in each of the independent flow paths. The solar receiver can also include: at least one access platform; a crane and/or maintenance beam(s) located at the top of the solar receiver; or an upper oven box enclosed by the upper heat shield and a lower oven box enclosed by the lower heat shield.

Generally, the inlets and outlets for each facet can be independently located in any corner of the receiver, and in either the upper plane or the lower plane. However, in particular embodiments, the SE quadrant facet outlet and the SW quadrant facet outlet are located in the same plane, for example the upper plane. The SE quadrant facet outlet and the SW quadrant facet outlet may both be located in a southern corner. The NE quadrant facet inlet and the NW quadrant facet inlet are located in the same plane, for example the lower plane. The NE quadrant facet inlet and the NW quadrant facet inlet may both be located in a northern corner.

The tubes in each tube panel may be configured, such as with a black coating, for increasing heat absorption. The solar receiver may further comprise a reflective insulated modular light barrier located behind each tube panel that reflects light back out towards the tubes.

Also disclosed in other embodiments is a molten salt solar receiver, comprising multiple heat transfer facets. Each facet comprises an inlet, an outlet, and one or more tube panels. Each tube panel comprises a plurality of tubes, an upper header, and a lower header. The tubes in each tube panel form a body that is wider than the upper header and the lower header. The multiple facets are arranged on an exterior of a support structure to form a NE flow quadrant, a NW flow quadrant, a SE flow quadrant, and a SW flow quadrant. The facets are fluidly connected so as to form two independent flow paths, one flow path including the NE flow quadrant and the SW flow quadrant, and the other flow path including the NW flow quadrant and the SE flow quadrant. The tube panels in a given facet are generally interconnected to form a serpentine flow path. The facet inlet and the facet outlet are each located along an edge of the facet, and usually along the same edge. Each tube panel is connected to the support structure by a toggling buckstay support system.

For a given tube panel, the ratio of the width of the body (formed by the tubes) to the width of either the upper header or the lower header may be at least 1.05:1.

The headers of each tube panel may be inward facing, which decreases the dimensions of the receiver. In particular embodiments, the upper headers and the lower headers of one facet are at a higher elevation than the upper headers and the lower headers of one or both of the adjacent facets. The facets can be arranged in a rectangular, square, polygonal, or circular configuration.

The solar receiver may further comprise an inlet vessel, and inlet piping that fluidly connects the inlet vessel to two adjacent flow quadrant facet inlets. The solar receiver can also further comprise an outlet vessel, and outlet piping that fluidly connects the outlet vessel to two adjacent flow quadrant facet outlets. The outlet vessel is generally located above the inlet vessel, or above the tube panels. A downcomer pipe then leads downwards from the outlet vessel. Alternatively, the solar receiver can also further comprise a downcomer pipe, and outlet piping that fluidly connects two adjacent flow quadrant facet outlets directly to the downcomer pipe. An outlet vessel is not present in such embodiments. A riser pipe and a bypass line can also be present, the riser pipe leading to the inlet vessel and the bypass line connecting the riser pipe to a downcomer pipe. The inlet vessel may be located below the multiple tube panels.

The solar receiver may further comprise an upper oven box enclosing the upper headers of the tube panels, and possibly an upper heat shield covering the upper oven box. The solar receiver may further comprise a lower oven box enclosing the lower headers of the tube panels, and possibly a lower heat shield covering the lower oven box. The solar receiver may further comprise a reflective insulated modular light barrier located behind each tube panel.

The SE flow quadrant facet outlet and the SW flow quadrant facet outlet may be located in a common plane. The SE flow quadrant facet outlet and the SW flow quadrant facet outlet may both be located in a southern corner. The NE flow quadrant facet inlet and the NW flow quadrant facet inlet may be located in a common plane. The NE flow quadrant facet inlet and the NW flow quadrant facet inlet may both be located in a northern corner.

Also disclosed in various embodiments is a heat transfer surface or facet capable of use on a solar receiver. The facet comprises one or more tube panels, each tube panel comprising at least one tube, an upper header, and a lower header, the tube panels being interconnected to form a serpentine flow path; a facet inlet; and a facet outlet. The facet inlet and the facet outlet are each located along an edge of the facet. There are usually a plurality of tube panels in the facet. The upper headers and the lower headers are laterally separated from each other.

Each tube panel may comprise one or more tubes, the tubes being placed parallel to each other to form a body that is wider than the upper header and the lower header. The facet inlet and the facet outlet may be located on the same edge of the facet, or on different edges. The headers of each tube panel may be inward facing (i.e. biased to the same side of the tubes).

Other embodiments of a heat transfer surface or facet capable of use on a solar receiver are also disclosed. The facet comprises an inlet, an outlet, and one or more tube panels. Each tube panel comprises a plurality of tubes, an upper header, and a lower header. The tubes of the tube panel form a body that is wider than the upper header and the lower header. The tube panels can be interconnected to form a serpentine flow path. The facet inlet and the facet outlet are each located along an edge of the facet, and can be on the same edge.

Also disclosed in embodiments is a molten salt solar power system, comprising: a vertical support structure; a central solar receiver located on the vertical support structure; a plurality of heliostats arranged around the vertical support structure; a cold storage tank configured to supply molten salt to the central solar receiver; and a hot storage tank configured to receive molten salt from the central solar receiver. The central solar receiver comprises multiple flow quadrants, each flow quadrant comprising one or more tube panels. Each tube panel comprises a plurality of tubes, an upper header, and a lower header. The tubes of each tube panel form a body that is wider than the upper header and the lower header. The multiple flow quadrants are arranged on an exterior of a support structure to form a NE flow quadrant, a NW flow quadrant, a SE flow quadrant, and a SW flow quadrant. The tube panels are fluidly connected so as to form two independent flow paths, one flow path including the NE flow quadrant and the SW flow quadrant, and the other flow path including the NW flow quadrant and the SE flow quadrant. It is contemplated that any number of receivers can be used in the solar power system, each receiver being located on a tower. Each tube panel can be connected to the support structure by a toggling buckstay support system.

The cold storage tank and the hot storage tank can be located at the base of the tower. The power system may further include a steam generation system that receives molten salt from the hot storage tank.

The headers of each tube panel may be inward facing. In particular embodiments, the upper headers and the lower headers of the tube panels in one flow quadrant at a higher elevation than the upper headers and the lower headers of the tube panels in one or both adjacent flow quadrants.

Also disclosed in different embodiments is a tube panel that comprises a plurality of tubes, an upper header, and a lower header. The tubes form a body that is wider than the upper header and the lower header.

The ratio of the width of the body (formed by the tubes) to the width of either the upper header or the lower header may be at least 1.05:1. In other embodiments, the upper header and the lower header are biased to one side of a plane formed by the plurality of tubes.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 8A is a side view of a tube panel.

FIG. 8B is a magnified perspective exploded view of the tube panel of FIG. 8A.

FIG. 16 is a magnified view of the top of the support structure of the solar receiver, and shows maintenance beams.

FIG. 17A is a perspective view showing a pair of maintenance beams in a stowed position, as well as possible first service position and second service position.

FIG. 17B is a plan view showing the arrangement of pins fixing a maintenance beam in the stowed position corresponding to FIG. 17A.

FIG. 17C is a plan view showing the arrangement of pins fixing a maintenance beam in the second service position.

FIG. 17D is a plan view showing the arrangement of pins fixing a maintenance beam in the first service position.

DETAILED DESCRIPTION

Figure 1:
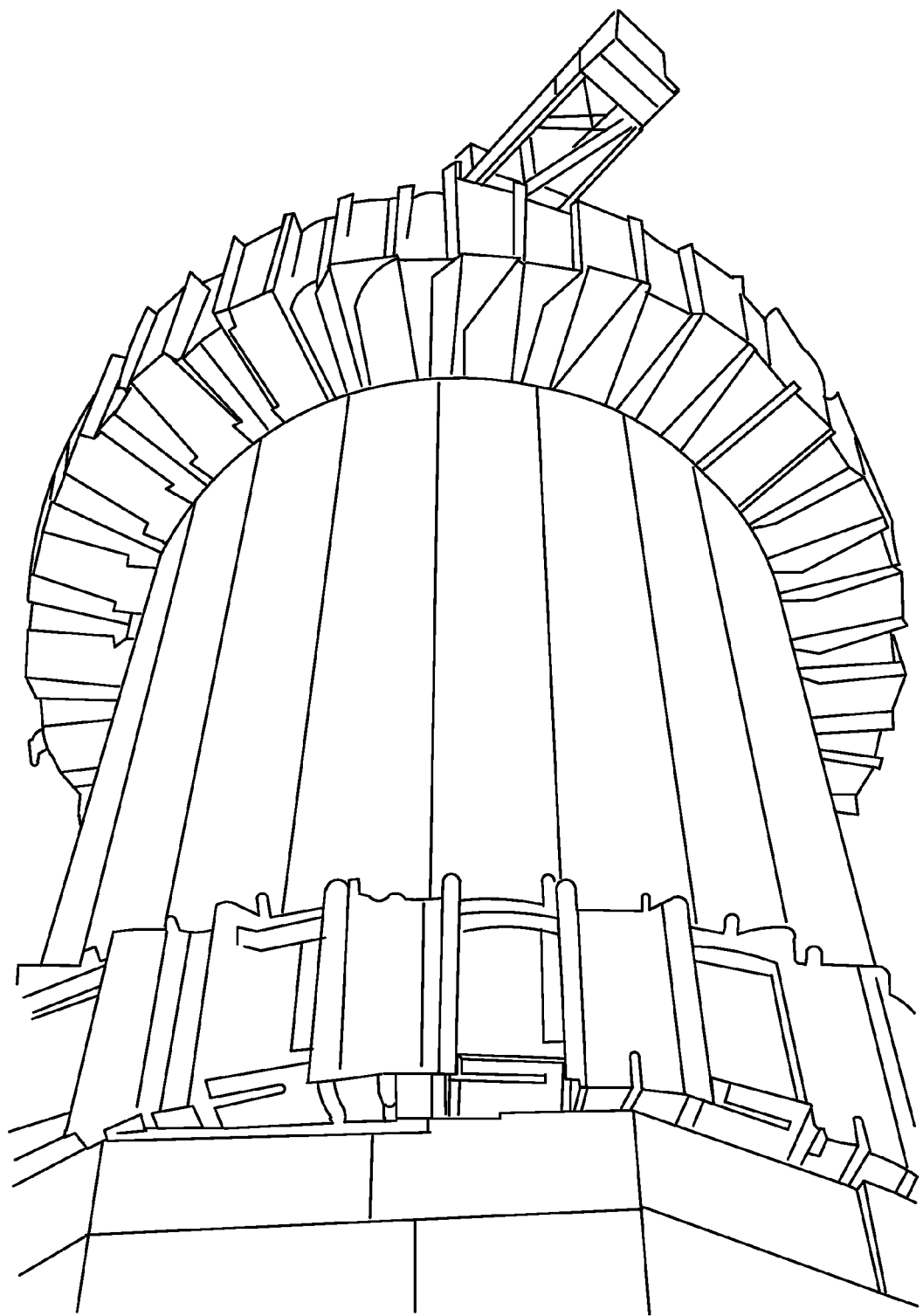
FIG. 1 is a depiction of the solar receiver of the Solar Two project.
Figure 2:
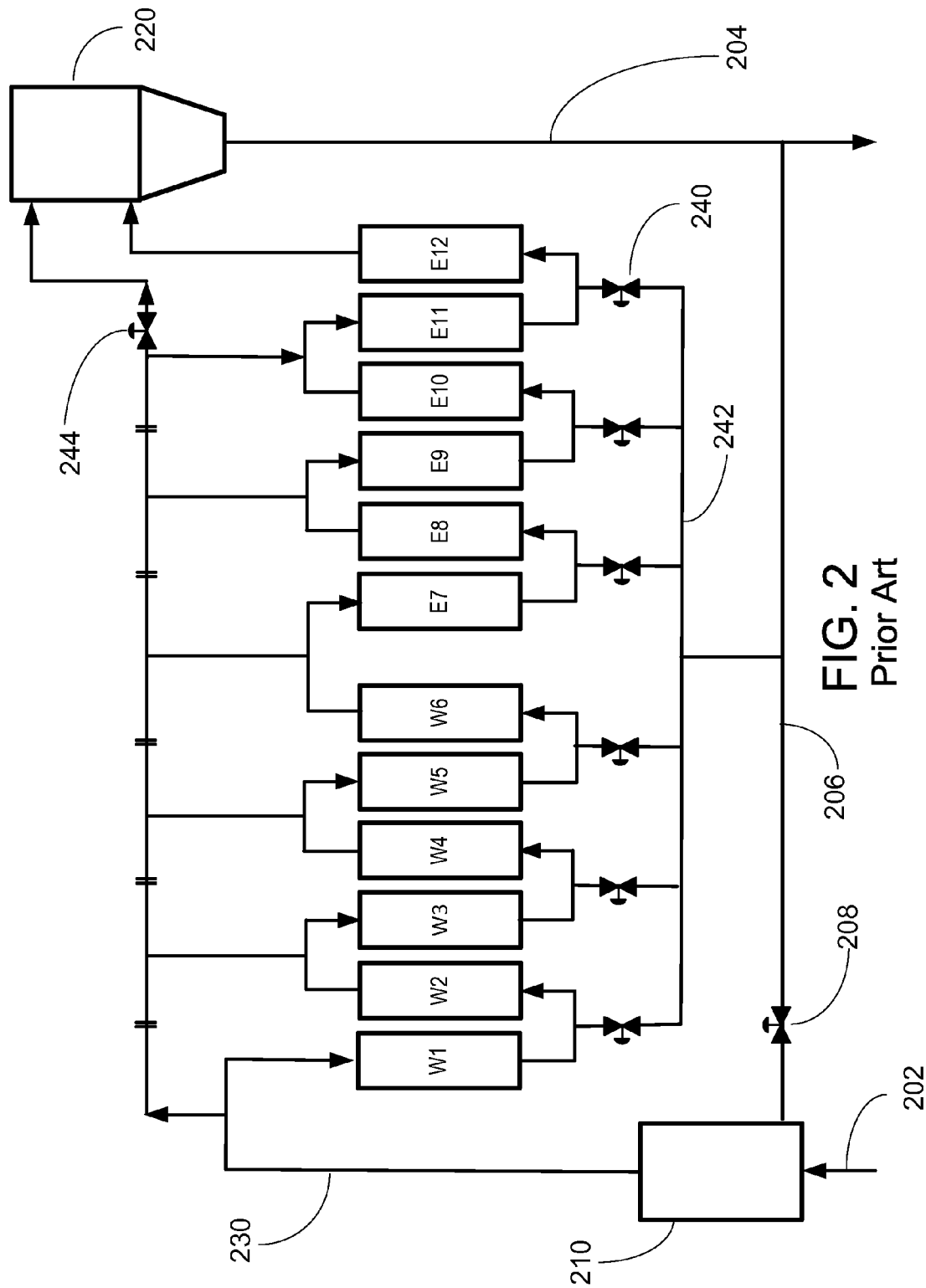
FIG. 2 is a schematic showing one flow path and one bypass path for the solar receiver of the Solar Two project.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

It should be noted that many of the terms used herein are relative terms. For example, the terms "inlet" and "outlet" are relative to a direction of flow, and should not be construed as requiring a particular orientation or location of the structure. Similarly, the terms "upper" and "lower" are relative to each other in location, i.e. an upper component is located at a higher elevation than a lower component. In addition, the terms "north" and "south" are used to indicate locations that are opposite each other, as are "east" and "west". These directional terms are relative to each other, and should not be construed as referring to an absolute direction with reference to the geographic or magnetic North Pole of the earth.

The term "plane" is used herein to refer generally to a common level, and should be construed as referring to a volume, not as a flat surface.

To the extent that explanations of certain terminology or principles of the solar receiver, boiler and/or steam generator arts may be necessary to understand the present disclosure, the reader is referred to *Steam/its generation and use*, 40th Edition, Stultz and Kitto, Eds., Copyright 1992, The Babcock & Wilcox Company, and to *Steam/its generation and use*, 41st Edition, Kitto and Stultz, Eds., Copyright 2005, The Babcock & Wilcox Company, the texts of which are hereby incorporated by reference as though fully set forth herein.

The present disclosure relates to a solar receiver design that can be used with Concentrated Solar Tower technology, also known as Concentrating Solar Power (CSP) technology. Generally, the solar receiver is located at the top of a vertical support structure which rises above a ground level or grade. The vertical support structure may be supported from a base. Buckstays can be provided on the vertical support structure to provide lateral support for the arrangement of heat transfer surfaces, which advantageously comprise loose tangent tube panels, while allowing for unrestrained thermal expansion of the tubes/tube panels in both the horizontal and vertical directions, thereby eliminating additional tube stresses.

The vertical support structure, buckstays, and other structural members not only provide structural support and rigidity for the tubes/tube panels of the heat transfer surfaces, but also a means by which the solar receiver can be picked up and lifted for placement at a desired location. The structure permits the solar receiver to be shop-assembled, transported, and then lifted and set upon a tower as a unit during installation. The vertical support structure remains with the solar receiver, thereby facilitating (if necessary) the removal of the solar receiver from the tower should it become desirable to do so.

The receiver is an assembly of tubes with molten salts or other heat transfer fluid (HTF) flowing inside the tubes. At grade, a field of mirrors called heliostats track the sun's movement and focus sunlight onto the heat transfer surfaces of the receiver. The HTF inside the tubes of the receiver absorbs the concentrated solar energy, causing the HTF to increase in temperature and/or change phases, so that the HTF captures the solar energy. It is contemplated that the solar receiver of the present disclosure is particularly to be used with molten nitrate salt as the HTF.

Competitor systems typically use a single, large, field-erected receiver in the middle of a single field of heliostats. However, the solar receiver of the present disclosure is contemplated to be incorporated in a power plant that takes a modular approach, using several smaller solar receivers that produce an output that is equivalent to that of a single large receiver. In particular, this smaller size allows for shop assembly, or in other words the solar receiver can be shipped to the field site as one assembled piece, rather than as several smaller pieces that are assembled together at the field site. This improves quality, minimizes field labor costs, allows for faster installation once the receiver is onsite, and eases permitting since the towers are shorter. The modular approach further allows for a scalable plant size that may be changed by simply changing the quantity of towers and receivers. Plant risk is also reduced because the same receiver design can be used to scale the plant up or down; the design does not need to be changed.

This molten salt solar receiver applies many concepts such as: shop assembly, modularity, heat transfer surfaces using top supported loose tangent tubes and headers arranged for an alternating up-down serpentine flow, a tube attachment/buckstay system, and a light barrier behind the tube panels, among others.

Generally, the molten salt receiver uses molten salt as the HTF instead of steam and water flowing through the tubes. Such molten salts can include sodium nitrate salts and potassium nitrate salts. "Cold" molten salt at an inlet temperature of about 550° F. (288° C., 561° K) is pumped from a cold molten salt storage tank into the tubes of the receiver. The solar energy focused on the tube panels heats the molten salt to an outlet temperature of about 1050° F. (566° C., 839° K). Upon exiting the solar receiver, this "hot" molten salt is returned to grade level and stored in a hot molten salt tank. This completes the energy collection process.

When desired, electricity is generated by pumping the hot salt from the hot salt storage tank to a steam generation system. This is a system of tube and shell heat exchangers that transfers the thermal energy from the hot molten salt to water in order to produce high temperature, high pressure steam. The steam is then used to drive a conventional Rankine turbine generator. This completes the power generation process. The cooled salt returns to a cold salt storage tank and can be recirculated through the solar receivers.

The capacity of the energy collection system (heliostats and receiver) is greater than that required by the power generation system; hence the excess energy can be stored in the form of hot (1050° F.) molten salt. This allows the collection of energy at the solar receiver to be decoupled from the power generation. Energy storage is not possible with a steam/water receiver directly connected to a turbine, but is very desirable to a utility because the plant can produce and dispatch electricity as needed, such as during cloud cover and at night, for some amount of time depending on the size of the thermal storage system.

The shop-assembled solar receiver of the present disclosure is advantageously comprised of an arrangement of heat transfer surfaces and fluid conveying conduits (pipes, valves, etc.) and associated controls arranged in a particular fashion to transfer a desired amount of heat energy into the working fluid (i.e. molten salt). The heat transfer surfaces are advantageously made of tubes arranged into tangent tube panels, and are provided with inlet and outlet headers as required. As is known to those skilled in the art, the sizes of tubes, their material, diameter, wall thickness, number and arrangement for the heat transfer surfaces are based upon temperature and pressure for service, according to applicable design codes. Required heat transfer characteristics, circulation ratios, spot absorption rates, mass flow rates of the working fluid within the tubes, etc. are also important parameters which must be considered. Depending upon the geographic location where the solar receiver is to be installed, applicable seismic loads and design codes are also considered.

Figure 3:
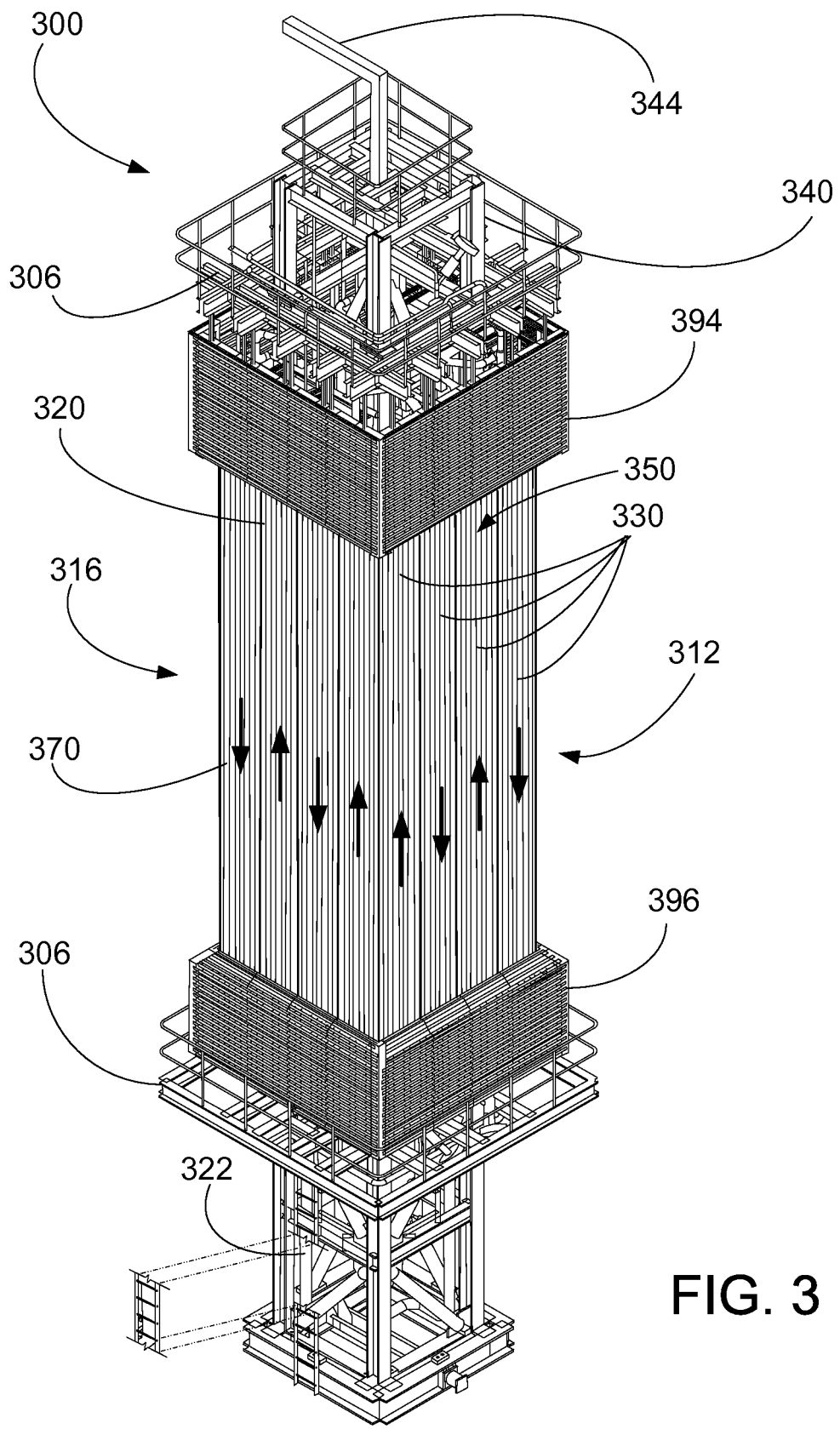
FIG. 3 is a perspective view of one embodiment of an assembled solar receiver of the present disclosure. This particular embodiment has four sides and does not use an outlet vessel.
Figure 4:
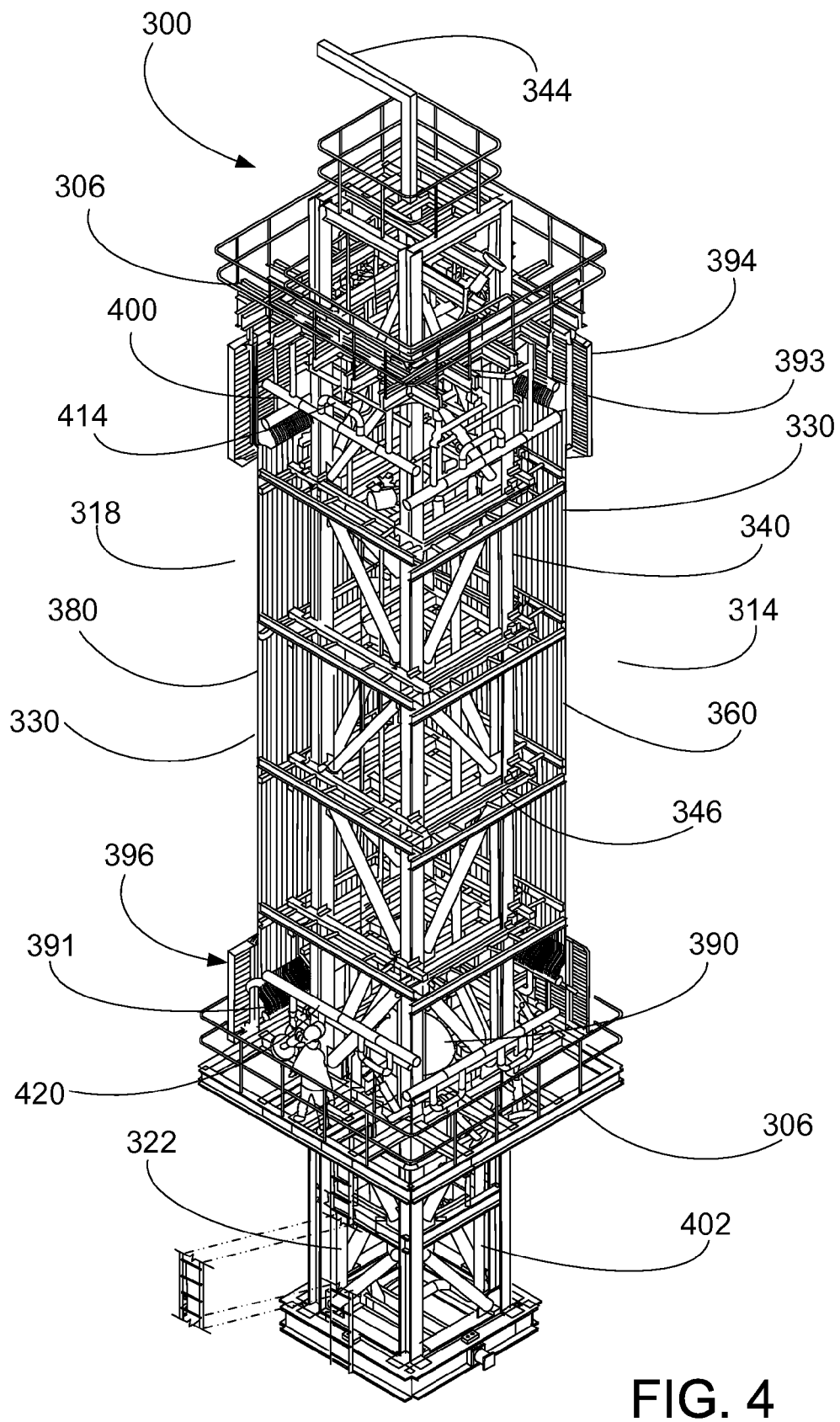
FIG. 4 is a perspective interior view of the assembled solar receiver of FIG. 3 illustrating the arrangement of heat transfer surfaces, and a vertical support structure provided to top support the heat transfer surfaces.
Figure 5:
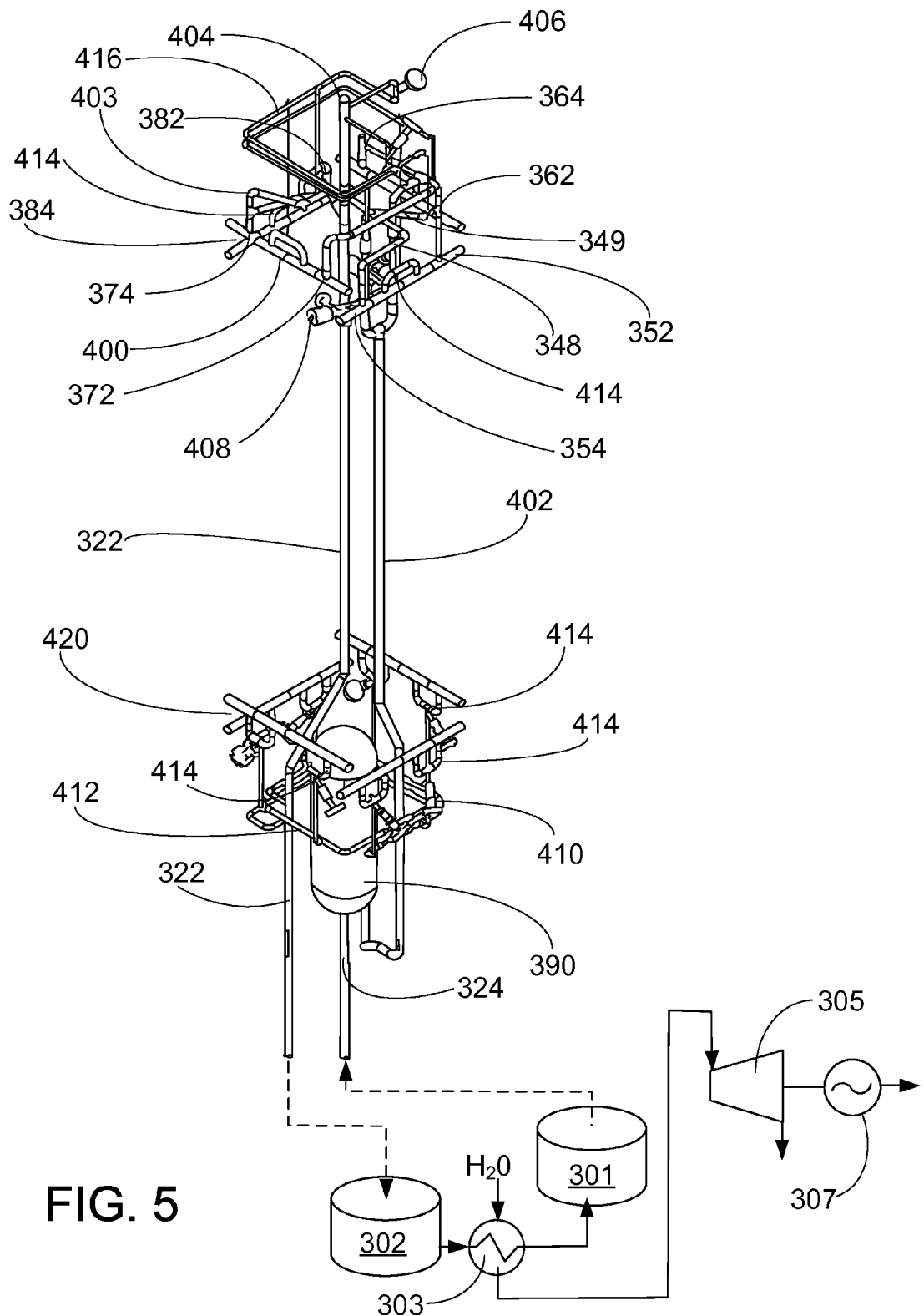
FIG. 5 is a diagrammatic view of the piping of the assembled solar receiver of FIG. 3, with various portions of the solar receiver removed for clarity.
Figure 6:
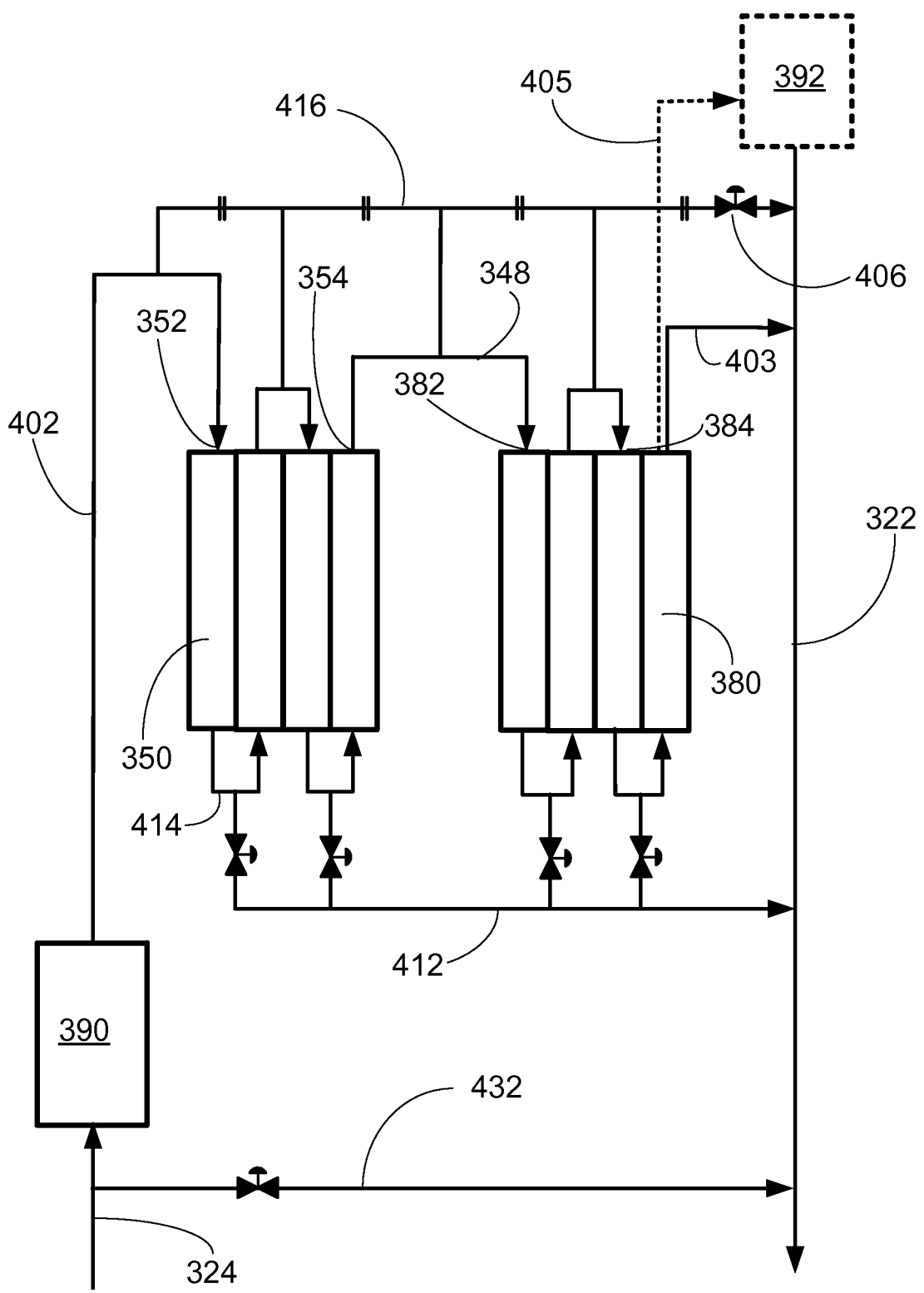
FIG. 6 is a schematic showing one flow path for the solar receiver of the present disclosure.
Figure 7A:
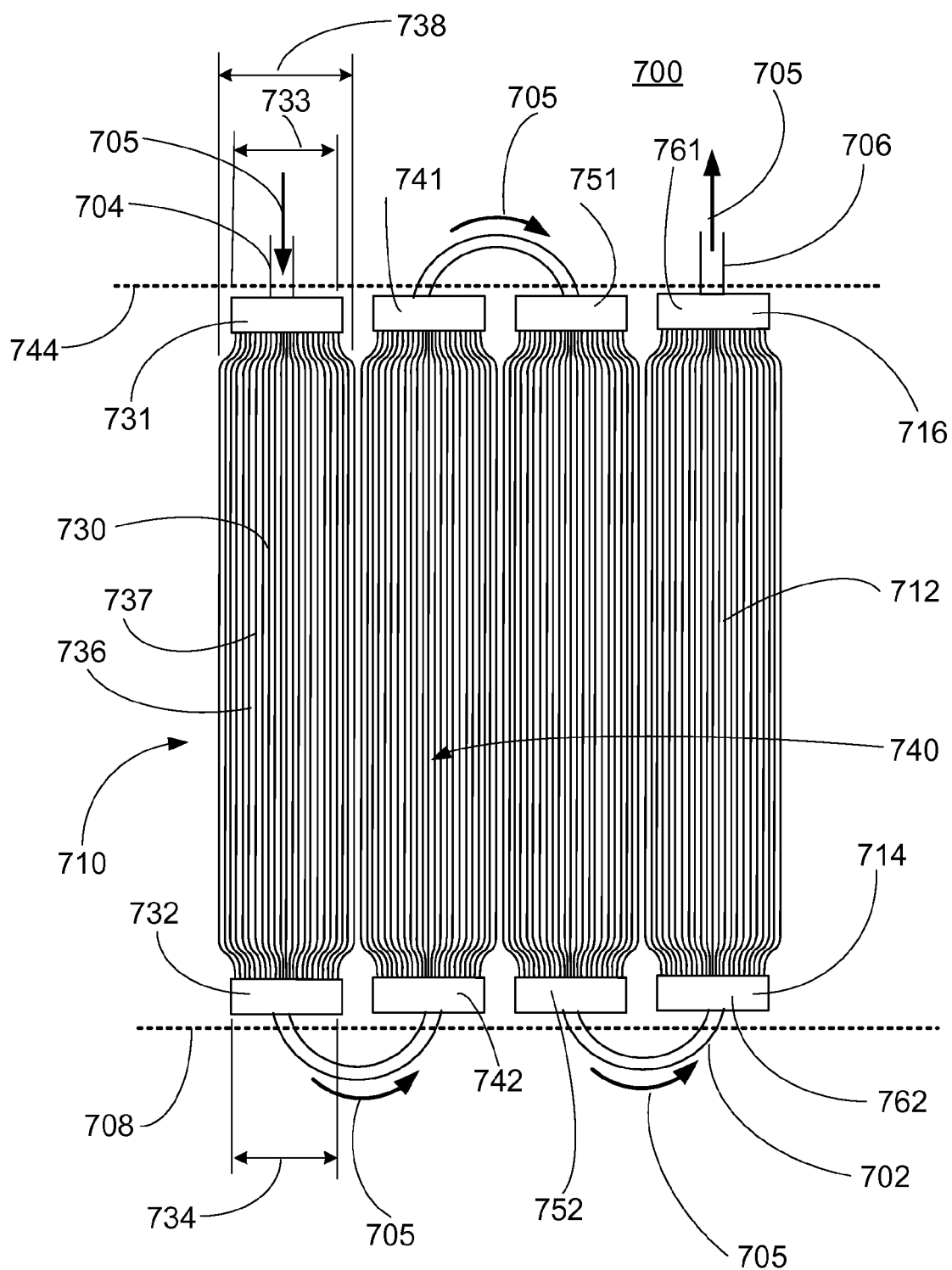
FIG. 7A is an enlarged front view of a facet including multiple tube panels, which can be used to form one side of a square or rectangular version of a solar receiver of the present disclosure.
Figure 7B:
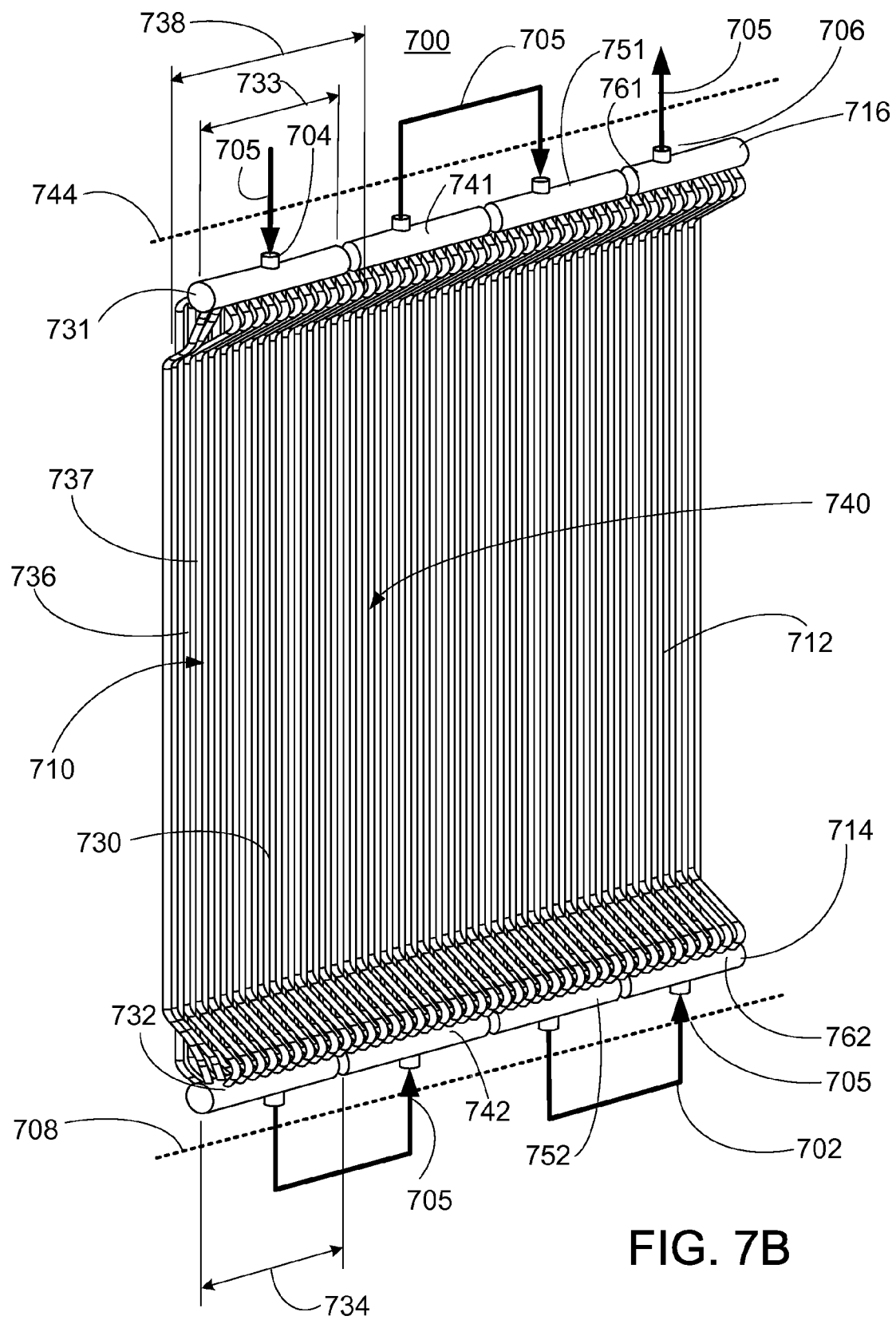
FIG. 7B is an interior perspective view of the facet of FIG. 7A.
Figure 7C:
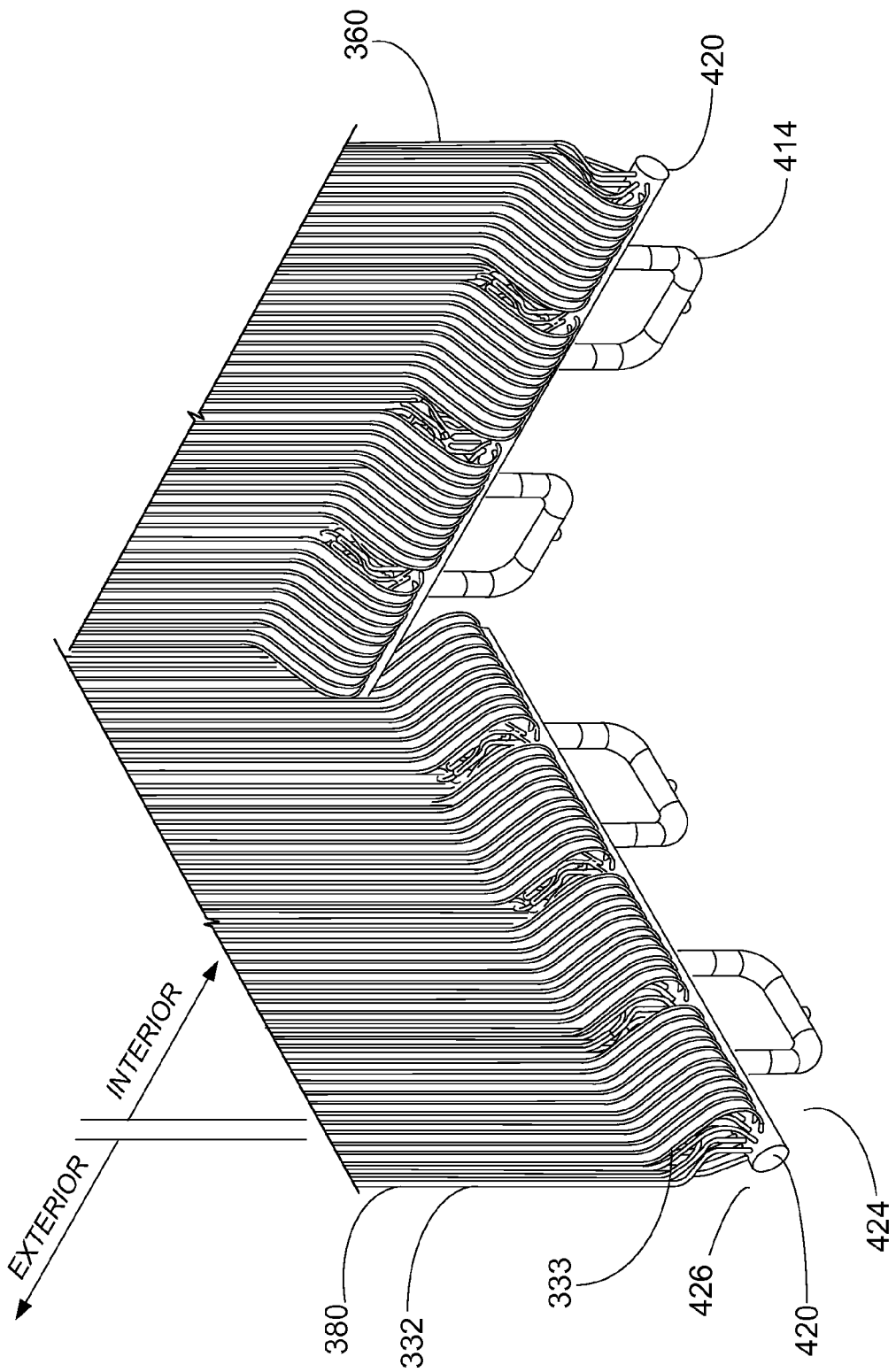
FIG. 7C is an enlarged interior perspective view of two adjacent facets of a solar receiver, showing the different elevation of the headers (which aids in reducing the dimensions of the receiver).

FIGS. 3-7C illustrate various aspects of the solar receiver of the present disclosure. FIG. 3 is a perspective external view of one embodiment of an assembled solar receiver. The receiver is modular, shop-assembled, and truck-shippable. The receiver uses molten salt as the heat transfer fluid. The receiver also includes heat FIG. 4 is a perspective interior view of the solar receiver of FIG. 3, so the interior and the back side can be seen. It illustrates principally the support system for the heat transfer surfaces and the other components of the molten salt heat transfer system. FIG. 5 shows certain pipes, vents, drains, and storage tanks that make up part of the molten salt heat transfer system. FIG. 6 shows a flow path of the molten salt in the solar receiver of FIG. 3. FIGS. 7A-7C illustrate certain aspects of the tube panels that comprise the heat transfer facets used on the solar receiver.

When viewed from the top, the solar receiver in some specific embodiments has dimensions of approximately 11 feet by 11 feet on each side. When viewed from the side, the heat absorbing area of the solar receiver is approximately 30 feet high (i.e. a heat absorption height) by approximately 11 feet wide. The size of the receiver is relatively small compared to competitor units and facilitates maximum shop assembly and truck shippability in order to reduce field construction time and costs. It is contemplated that the receiver dimensions are flexible to some extent to meet thermal performance requirements while still achieving shop assembly and truck shippability.

The solar receiver can be divided into four different quadrants. Each quadrant contains at least one facet 320, and each facet contains at least one tube panel as further described herein. The northeast (NE) quadrant 312 and southeast (SE) quadrant 316 are visible in FIG. 3, along with NE facet 350 and SE facet 370. The northwest (NW) quadrant 314 and southwest (SW) quadrant 318 are visible in FIG. 4, along with NW facet 360 and SW facet 380.

As seen in FIGS. 3-7C, the components of the solar receiver are initially described based on the flow path for the molten salt. Initially referring to FIG. 3, the solar receiver 300 can be mounted upon a vertical support structure (not shown), such as a tower, to increase the area upon which heliostats mounted at grade can be placed and still illuminate the solar receiver.

Turning now to FIG. 5, cold molten salt at about 550° F. is pumped up the tower from a cold salt storage tank 301 through the riser pipe 324 into the inlet vessel 390, which acts as a pressurized reservoir of excess molten salt. In the event salt flow to the tower is stopped due to pump failure or some other reason, the molten salt in the inlet vessel 390 can continue to provide flow and cooling to the facets of the solar receiver while heat is removed from the tubes by redirecting the heliostats to focus away from the solar receiver. From the inlet vessel 390, molten salt flows to the northern corner of the receiver and splits into two parallel flow paths. One of the flow paths enters the NE facet inlet 352 and the other flow path enters the NW facet inlet 362. Generally speaking, the inlets for the two flow paths are located in a common corner. For example, the facet inlets could alternatively be located on the southern corner. The direction of molten salt flow may differ depending on whether the solar receiver is located in the Northern Hemisphere or the Southern Hemisphere of the earth, and this may affect which corner the inlets are located in.

Inside the NE facet 350 and the NW facet 360, the salt is heated by the concentrated solar energy from the heliostat field that is focused on the tubes in the facets. Each facet is composed of one or more tube panels 330 (illustrated in FIG. 3 as four tube panels). Each tube panel comprises at least one tube 712, an inlet header 714, and an outlet header 716 (see FIG. 7A). The tube panels are connected to each other in series by interconnecting piping, such as jumper pipes 414 (see FIG. 5). The tube panels 330 are organized in a vertical or axial direction, such that the molten salt flows in an alternating up-down direction through the tube panels (indicated by the arrows in FIG. 3, FIG. 6, and FIG. 7). This change in flow direction is referred to herein as a serpentine flow path. Again, each facet can have a height of from about 10 feet to about 50 feet. Each facet can have a width from about 8 feet to about 20 feet.

Referring to FIG. 3 and FIG. 4, molten salt from the NE quadant 312 is subsequently "crossed over" to the facet on the SW quadrant 318, and the molten salt from the NW quadrant 314 is "crossed over" to the facet on the SE quadrant 316. The cross-overs are intended to balance east/west differences in salt temperature caused by the natural east-to-west variation in solar absorption. Salt heating continues in the SE and SW quadrant facets, which are also composed of multiple up-down serpentine style tube panels.

The piping for this crossing over is seen in FIG. 5. A first crossover pipe 348 fluidly connects the NE facet outlet 354 to the SW facet inlet 382. A second crossover pipe 349 fluidly connects the NW facet outlet 364 to the SE facet inlet 372. Molten salt subsequently exits the SE facet outlet 374 and the SW facet outlet 384 at a southern corner. This molten salt has a temperature of about 1050° F. and is piped directly to the downcomer pipe 322. The downcomer pipe operates at atmospheric pressure and is vented to atmosphere (indicated by reference numeral 404). The salt then flows by gravity down the tower and to the hot salt storage tank 302. This completes the energy collection process. The stored thermal energy in the hot molten salt can be used at the utility's discretion to generate steam and electricity. This is done by, for example, running the molten salt from the hot salt storage tank 302 through a heat exchanger 303. The cooler salt then runs into cold salt storage tank 301. Water enters heat exchanger 303 and is converted to steam. The steam can be sent to turbine 305, which drives an electrical generator 307.

As explained and further described herein, in some embodiments, an outlet vessel may be present between the facets and the downcomer pipe. While the pipes are illustrated as being relatively straight fluid paths, it will be appreciated by those skilled in the art that their actual design in terms of arrangement and length will be determined by the degree of flexibility required to accommodate expected motions caused by thermal expansion and contraction during operation of the solar receiver. It is thus likely that additional bends or length may be necessary to provide such flexibility.

The support structure 340 is shown in FIG. 4 as a set of beams and girders in the shape of a square. An upper heat shield 394 and a lower heat shield 396 cover the upper and lower structural steel portions above and below the tube panels 330. These shields 394, 396 protect these uncooled components from heat flux spillage that misses the heat absorbing surfaces of the tube panels (i.e. misaimed light from the heliostats). The heat shields extend around the perimeter of the solar receiver. One end or edge of the heat shields is bolted or welded to the support structure 340 and the other end is free. The heat shields are made of thin gauge steel with stiffeners on the interior side and along the free edge to resist wind and seismic loads. The heat shields may also be joined at the corners to provide additional stiffness to avoid attachment to the tubes. Provisions for thermal expansion to reduce or prevent buckling are present. The heat shields are reflective (e.g. painted white) on the exposed side and are not insulated on the interior side to reduce operating temperature. A gap is provided between the heat shields and tube panels to allow natural circulation of air for additional cooling. To reduce shipping dimensions, the shields may be field installed.

Continuing with FIG. 4, an upper oven cover 393 encloses the upper headers 400 and upper tube bends of the facets, while a lower oven cover 391 encloses the lower headers 420 and lower tube bends of the facets. The oven covers are themselves covered by the heat shields 394, 396 (see FIG. 3). The oven covers 391, 393 preheat those areas of the receiver panels that are not exposed to the concentrated solar heat flux. Electric heaters are used to preheat insulated tube panel bends and headers. Preheating is necessary at startup to ensure that all metal which comes in contact with salt is heated to above the salt freeze point before salt is introduced to the solar receiver, thus preventing salt freezes that can cause blockage and damage components. In this regard, it should be noted that the oven covers could be rigid insulated boxes with electric heater elements inside the box, or could alternatively be a soft cover such as an insulated heating blanket.

Figure 15:
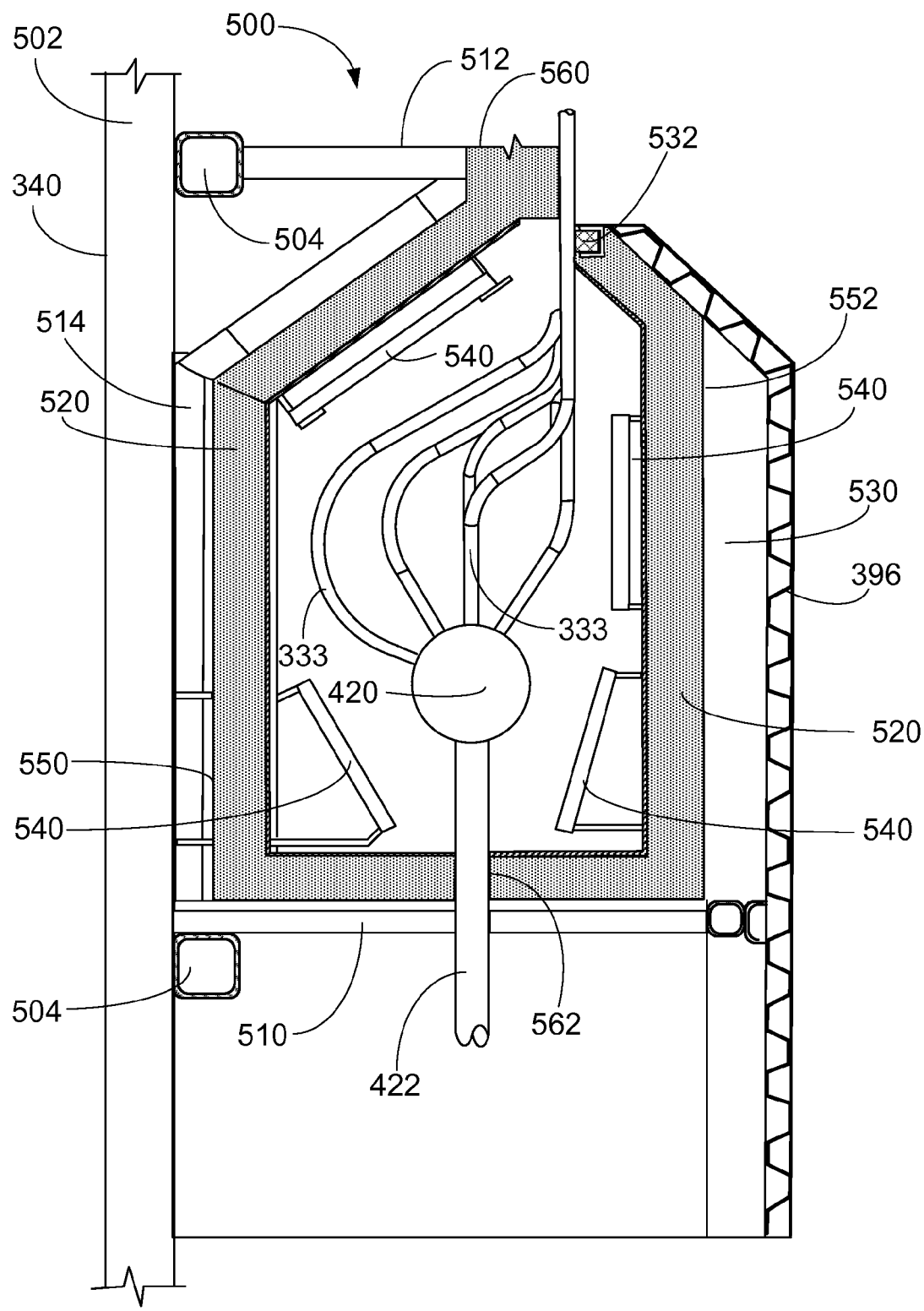
FIG. 15 is a side cross-sectional view of an oven box that can be used with the solar receiver of the present disclosure.

FIG. 15 is a cross-sectional side view of an exemplary oven cover or oven box. The oven box 500 depicted here corresponds to a lower oven cover 391 of FIG. 4. One vertical column 502 and two horizontal beams 504 of the support structure 340 are seen here, to which the oven box is attached. The oven box surrounds a lower header 420 and the tube bends 333 of the tubes in the facet. A drain pipe 422 runs out the bottom of the lower header.

At the bottom of the oven box is a bottom horizontal support 510 which extends outwards away from the vertical column 502. A top horizontal support 512 also extends away from the vertical column 502 at the top of the oven box. Stiffeners 514 run from the top horizontal support 512 to the bottom horizontal support 510. Outside of the oven box is the heat shield 396. An insulating layer 520 has a roughly pentagonal shape, and runs from the top horizontal support along the stiffeners to the bottom horizontal support, across the bottom horizontal support, and along the heat shield. An air gap 530 is present between the insulating layer 520 and the heat shield 396. The insulating layer has a high R-value and can be somewhat thick (approximately 3 inches). A sliding seal 532 is present between the heat shield 396 and the tubes 332. Electric heaters 540 are located within the oven box. Those heaters are surrounded by the insulating layer 520. It is contemplated that four or five heaters may be used, and that those heaters may have dimensions of, for example, 12 inches by 30 inches.

The oven box may be made in two separate portions. For example, the oven box 500 may have an interior side 550 and an exterior side 552, which are joined together. The interior side can be removed in two pieces. The exterior side can be made from one piece. A splice 560 is present at the top of the oven box between the top horizontal support 512 and one end of the insulating layer 520. Another splice 562 is present along the bottom horizontal support 510, between the interior side 550 and the exterior side 552.

As illustrated in FIG. 4, a toggling buckstay support system 346 is used to attach each tube panel to the support structure 340. This system provides the tube panels with horizontal (lateral) stability while allowing the tubes to independently and freely expand vertically (axially), which reduces tube stresses. All tube panels are top supported and hung from the support structure 340 that is internal to the receiver. It should be noted that the headers of adjacent tube panels on each facet at each level (upper/lower) are laterally separated (horizontally) from each other. Separating the headers of each facet allows each tube panel to expand differentially, which is necessary to reduce stresses since each tube panel 330 will be operating at a higher temperature than the previous panel. All tube panels are composed of thin-walled, loose, tangent tubes which allow tube-to-tube differential expansion and reduced tube stresses. The tube attachments allow for unrestrained thermal expansion of the tube panels in both the horizontal and vertical directions, thereby eliminating additional tube stresses. These design features maximize flexibility and minimize thermal stresses and the potential for tube bowing. The tubes may be coated, such as painted black, in order to enhance solar energy absorption. A light absorbing black paint or oxide can be used for this purpose.

FIG. 5 shows the internal piping arrangement associated with the solar receiver depicted in FIG. 3 and FIG. 4. The facets/tube panels of the solar receiver are fully drainable and ventable. The receiver is usually drained when not in use, at sunset, or when available solar energy is too low. Molten salt solidifies at approximately 430° F. (221° C., 494° K). If not drained, the salt can freeze inside the tubes and plug the receiver. As seen here, the solar receiver can include a vent valve 406 for each independent flow path. The vent valve is typically located near the top of the downcomer pipe 322, and the vent piping 416 is also illustrated connecting the flow path to the downcomer pipe.

A flow control valve 408 is also shown for each independent flow path. The flow control valve automatically and independently modulates the flow of the molten salt to control the final temperature of the molten salt as it exits the flow path to meet a setpoint temperature. The flow control valve is typically located at the inlet where cold salt is supplied to the flow path.

The solar receiver can also include drain valves 410. One drain valve is typically provided for each pair of tube panels, and are located beneath the tube panels. The drain piping 412 is also illustrated, and connects to the downcomer 322 so that molten salt present in the tube panels drains and flows into the downcomer pipe 322. The vent valves, flow control valves, and drain valves are automated.

As previously noted, each facet is made up of one or more tube panels, with each tube panel including an inlet header and an outlet header. The tube panels are aligned so that the headers are arranged in a group of lower headers 420 and upper headers 400. The jumper pipes 414 between adjacent headers is also illustrated.

FIG. 6 is a diagram showing the flow of molten salt through one of the two independent flow paths in the solar receiver, the flow path through the NE and SW facets. Initially, the inlet vessel 390 is located below the facets 350, 380 (each of which have four tube panels). The jumper pipes 414 between tube panels is shown. A riser pipe 324 provides cold molten salt to the inlet vessel 390. An inlet pipe 402 fluidly connects the inlet vessel 390 to the NE facet inlet 352. The NE facet outlet 354 is fluidly connected to the SW facet inlet 382 through a crossover pipe 348. An outlet pipe 403 fluidly connects the SW facet outlet 384 to the downcomer pipe 322.

There may also be a bypass line that allows molten salt to bypass the solar receiver facets altogether, by connecting the inlet pipe 402 to the downcomer pipe 322. Typically this is done at startup while the facets and oven covers are being preheated to reduce the risk of salt freezes in the panels, or is done overnight to keep the tower piping warm to avoid energizing the heat tracing. The bypass line 432 connects the riser 324 to the downcomer pipe 322 upstream of the inlet vessel 390. The bypass line can be located at a low elevation closer to grade or within the tower upon which the solar receiver is perched. A valve controls the flow through the bypass line.

A similar flow path is present for the NW and SE facets in the solar receiver, though not illustrated. A second inlet pipe fluidly connects the inlet vessel to the NW facet inlet. It should be noted that one common pipe typically exits the inlet vessel, and then splits to form two inlet pipes that feed the two flow paths. The NW facet outlet is fluidly connected to the SE facet inlet through a second crossover pipe. A second outlet pipe fluidly connects the SE facet outlet to the downcomer pipe. Molten salt can flow from the inlet vessel through the NW facet and the SE facet to the downcomer pipe 322.

FIG. 7A is an enlarged front view of a side of the solar receiver showing the multiple tube panels 730 that make up a facet 320 in FIG. 3. FIG. 7B is an interior perspective view of the tube panels 730. Generally speaking, the facet 700 is formed from a plurality of tube panels 710, depicted here with four tube panels. Each tube panel comprises one or more tubes 712 which are parallel to each other. The tubes 712 pass between an inlet header 714 and an outlet header 716 to form a body or wall 737 upon which the focused solar energy from the heliostats can be directed. The tube panels 710 are interconnected using jumper pipes 702 (also reference numeral 414 in FIG. 5). These interconnections form a serpentine flow path across the side of the receiver, which is indicated with arrows 705. The flow path begins at facet inlet 704 and ends at facet outlet 706. It should be noted that if there is an even number of tube panels 710, the facet inlet 704 and the facet outlet 706 may be located along a common edge 708 or 744 of the facet 700. Alternatively, the facet inlet 704 and facet outlet 706 can be located on opposite edges 708 and 744 of the tube panel 700 when an odd number of tube panels is used. In other words, the facet inlet and the facet outlet can be independently located at the top edge 744 or the bottom edge 708, as required by the design of the receiver. As depicted here, the facet inlet 704 and the facet outlet 706 are both located along the top edge 744.

As previously noted, an inlet header is defined as such relative to the direction of flow. Thus, for tube panel 730, header 731 is considered the inlet header and header 732 is considered the outlet header. However, for adjacent tube panel 740, header 742 is considered the inlet header and header 741 is considered the outlet header. The headers of the tube panels can also be designated as upper headers 731, 741, 751, 761 and lower headers 732, 742, 752, 762 wherein the upper headers are located above the lower headers. Put another way, one set of headers 732, 742, 752, 762 is located in lower plane 708, and the other set of headers 731, 741, 751, 761 is located in an upper plane 744.

Referring again to tube panel 730, the tubes 736 form a body 737. The tubes are closely spaced and parallel to each other. As illustrated in FIG. 7A and FIG. 7B, the upper header 731 has a width 733, and the lower header 732 has a width 734. The body 737 has a width 738 that is greater than the header widths 733, 734. In other words, the body 737 is wider than the lower header 732 and the upper header 731. The width is measured in the horizontal direction. The lower header and the upper header of each tube panel are the same width. The ratio of the body width 737 to the width of the lower header or upper header 732, 731 is at least 1.05:1, and may range from 1.05 to 1.5. The upper headers of adjacent tube panels are laterally separated from each other. The lower headers of adjacent tube panels are also laterally separated from each other. As previously explained, this allows the tube panels to expand differentially with respect to each other because they are operating at different temperatures. This also permits the facet to maintain the same close tube spacing between adjacent tube panels as between the tubes within a tube panel.

Referring to FIG. 7B, it should be noted that in each tube panel 710, the tubes 712 extend further away from the support structure than the headers 714, 716. In other words, the tubes are biased towards an exterior side of the headers. Put another way, the headers are inward facing or interior facing compared to the tubes, or can be described as inboard headers. Alternatively, the headers can be considered to be inward facing or inboard if they are closer to the interior of the solar receiver when compared to the plane formed by the tubes. The entire header is to one side of the plane formed by the tubes.

Referring to FIG. 5 and FIG. 7C, the headers of the facets in the NW flow quadrant and the SE flow quadrant are at a higher elevation than those of the facets in the NE flow quadrant and the SW flow quadrant. The headers and tube bends of the various facets can thus overlap. This reduces the shipping dimensions of the receiver, allowing truck shippability and also allows easier access from inside the receiver for tube repair/replacement. More generally, the upper headers in one facet are at a different elevation from the upper headers in an adjacent facet, and the lower headers in the one facet are also at a different elevation from the lower headers in the adjacent facet. Indeed, the upper headers and the lower headers of the one facet are at a different elevation than the upper headers and the lower headers in both adjacent facets. As the height of the tube panels is usually the same for the facets, this means that, for example, if the upper headers in the NW flow quadrant are at a higher elevation than the upper headers in the NE flow quadrant, then the lower headers in the NW flow quadrant are also at a higher elevation than the lower headers in the NE flow quadrant. The elevation is relative to grade.

In FIG. 7C, the lower headers 420 for the NW facet 360 and the SW facet 380 are seen. The headers have an interior side 424 (closer to the support structure) and an exterior side 426. The tubes 332 are biased towards the exterior side, and tube bends 333 are present to permit the tubes to be spaced out over a larger area on the headers. Jumper pipes 414 are also visible between tube panels. The headers on the NW facet 360 are at a higher elevation compared to the headers on the SW facet 380. The headers are also inboard headers.

FIG. 8A is a side view of a tube panel 710, and FIG. 8B is an enlarged perspective exploded view of the tube panel. A reflective modular panel light barrier 770 is located behind the tubes 712 opposite the heat absorbing (i.e. exterior) side of the tube panel. This light barrier is designed to protect the insulation 780, support structure (see reference numeral 340 in FIG. 4), and the interior parts of the solar receiver from rain and heat exposure that may get through the gaps between the loose tangent tubes of the tube panels. The modular design of the light barrier simplifies removal for inspections and/or maintenance. The light barrier 770 is composed of an array of metal sheets and is coated with white paint or other reflective material on the tube side to reflect light energy back into the tubes and reduce operating temperatures of the barrier plate. The light barrier is supported by the tube attachment structure, i.e. the buckstay support system 346. Behind the light barrier (i.e. further interior of the solar receiver) is the insulation 780, which is covered by lagging.

Figure 9:
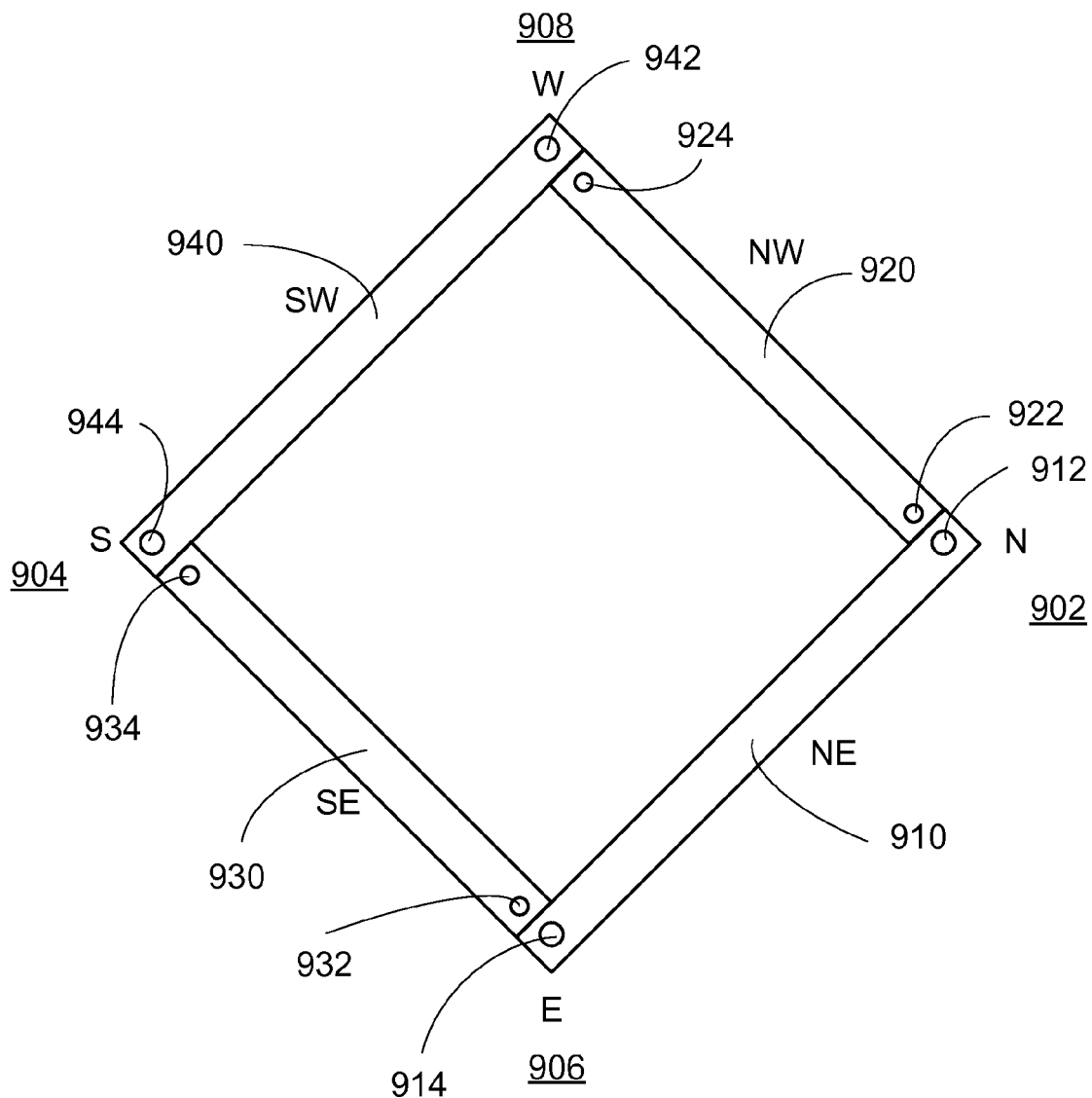
FIG. 9 is a top plan view of the facets of a square or rectangular version of the solar receiver of the present disclosure.

FIG. 9 is a schematic plan view (i.e. from above) of the facets of a solar receiver similar to that of FIG. 3. The solar receiver has a northern (N) corner 902, a southern (S) corner 904 opposite the N corner, an eastern (E) corner 906 between the N corner 902 and the S corner 904, and a western (W) corner 908 opposite the E corner. Here, the NE quadrant facet 910, NW quadrant facet 920, SE quadrant facet 930, and SW quadrant facet 940 can be seen. The quadrant inlet 912, 922, 932, 942 and the quadrant outlet 914, 924, 934, 944 for each facet is also indicated. In this schematic, the four sides are arranged in a rectangular configuration (i.e. in a shape having four 90° corners). However, it is contemplated that the solar receiver could be configured in other shapes (e.g. square, circular, polygonal) and still be divide into four different quadrants. The SE quadrant facet outlet 934 and the SW quadrant facet outlet 944 are both located in the southern corner 904. The SE quadrant facet inlet 932 is seen in the eastern corner 906, while the SW quadrant facet inlet 942 is seen in the western corner 908. The inlets and outlets for the SE and SW quadrant facets are located in an upper plane or lower plane as desired.

Figure 10:
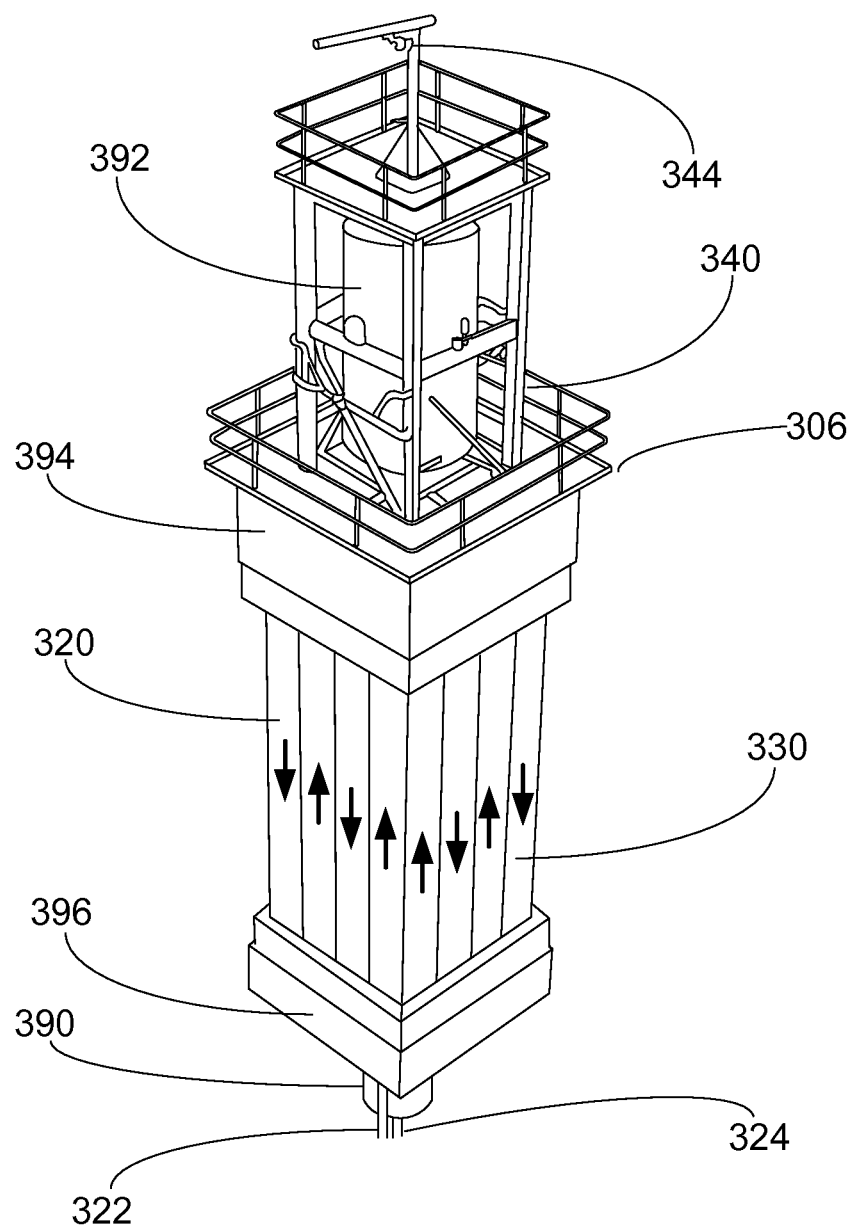
FIG. 10 is a perspective view of another embodiment of an assembled solar receiver of the present disclosure. This particular embodiment has four sides and includes an outlet vessel.

FIG. 10 is a perspective view of a second exemplary embodiment of a solar receiver of the present disclosure. This embodiment differs from that of FIG. 3 in that this embodiment includes an outlet vessel 392. The outlet vessel is located above the inlet vessel (not visible in this figure) and above the facets 320. When an outlet vessel is included, molten salt exits the two independent flow paths and flows into the outlet vessel instead of directly into the downcomer pipe 322. The purpose of an outlet vessel is to ensure that all solar receiver tubes are full of salt (prevent siphoning) and that the downcomer pipe 322 is full of salt. By gravity, hot molten salt flows from the outlet vessel 392 down the tower downcomer pipe 322 and to the hot salt storage tank (not shown). The outlet vessel can also store the salt from the inlet vessel if the downcomer plugs, allowing time for the heliostats to be off-pointed (i.e. away from the solar receiver). The outlet vessel may also be used to establish the salt level to indicate the receiver is filled. The liquid level in the outlet vessel can be automatically controlled by a throttle valve in the downcomer pipe. Also visible in FIG. 10 are the inlet vessel 390, riser pipe 324, lower heat shield 396, tube panels 330, upper heat shield 394, upper access platform 306, some of the support structure 340, and the crane 344.

FIG. 6 includes the optional outlet vessel 392 in dotted line. Rather than going directly to downcomer pipe 322, molten salt travels through outlet pipe 405 from the SW facet 380 goes to the outlet vessel 392, and subsequently to downcomer pipe 322.

The quantities of the tube panels and the tube sizes are designed to provide adequate cooling for a given solar receiver thermal rating and corresponding salt flow. However, the solar receiver of the present disclosure is flexible and different quantities of tube panels and/or other tube sizes are possible depending on the desired thermal rating of the solar receiver and the corresponding salt flow as long as tube metal temperatures and stresses are acceptable. While FIG. 3 and FIG. 10 illustrates a square solar receiver (in the plan view), other plan geometries are possible: e.g. circular, rectangular, hexagonal, octagonal, n-sided polygon, etc. It is believed that a square receiver offers the advantage of maximizing heating surface area while still being compact which reduces shipping costs. It should be noted that a square receiver is a special case of a rectangular geometry.

Figure 11:
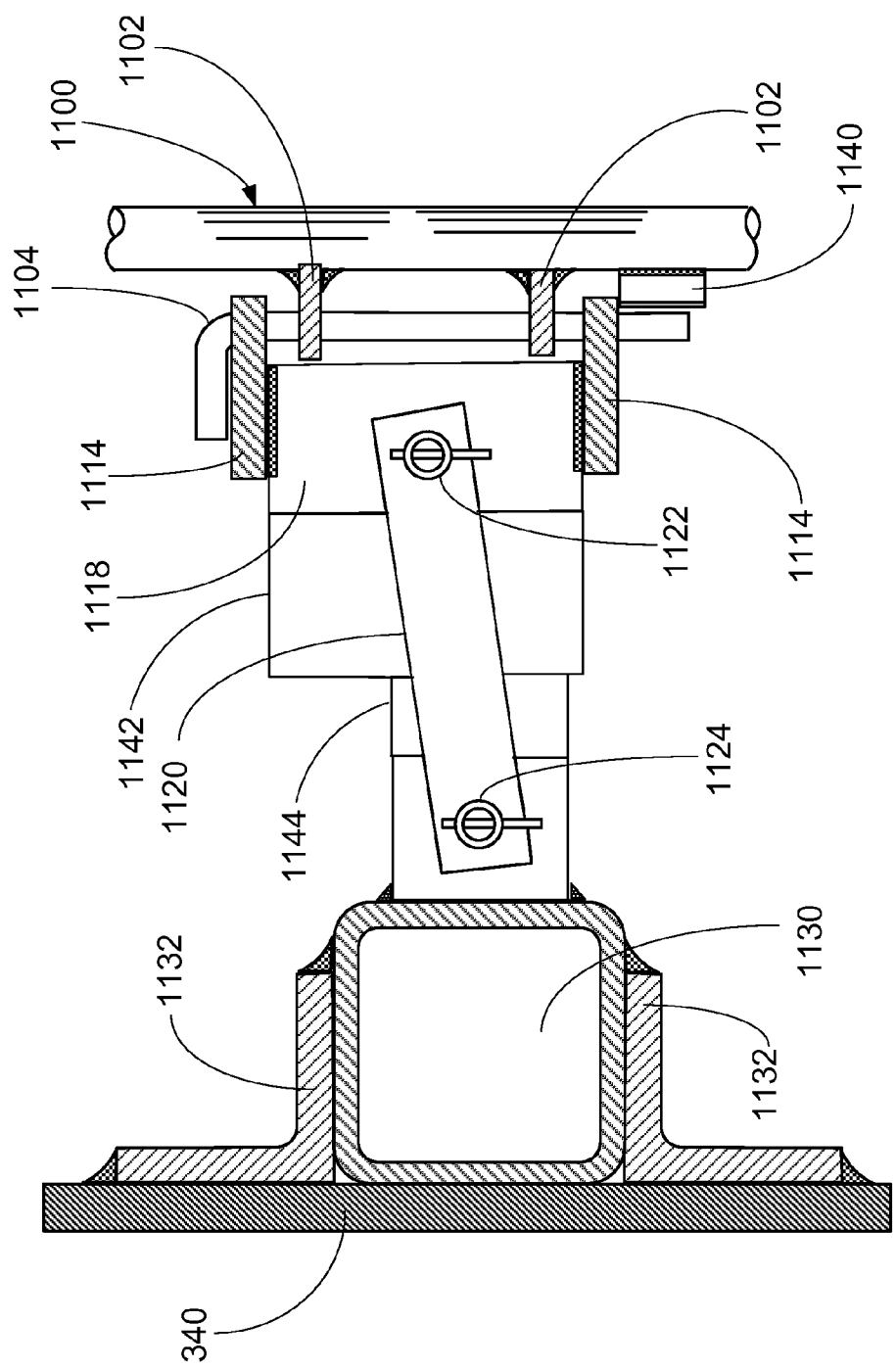
FIG. 11 is a side cross-sectional view of some portions of a toggling buckstay support system used to connect facets or panels to the support structure.
Figure 12:
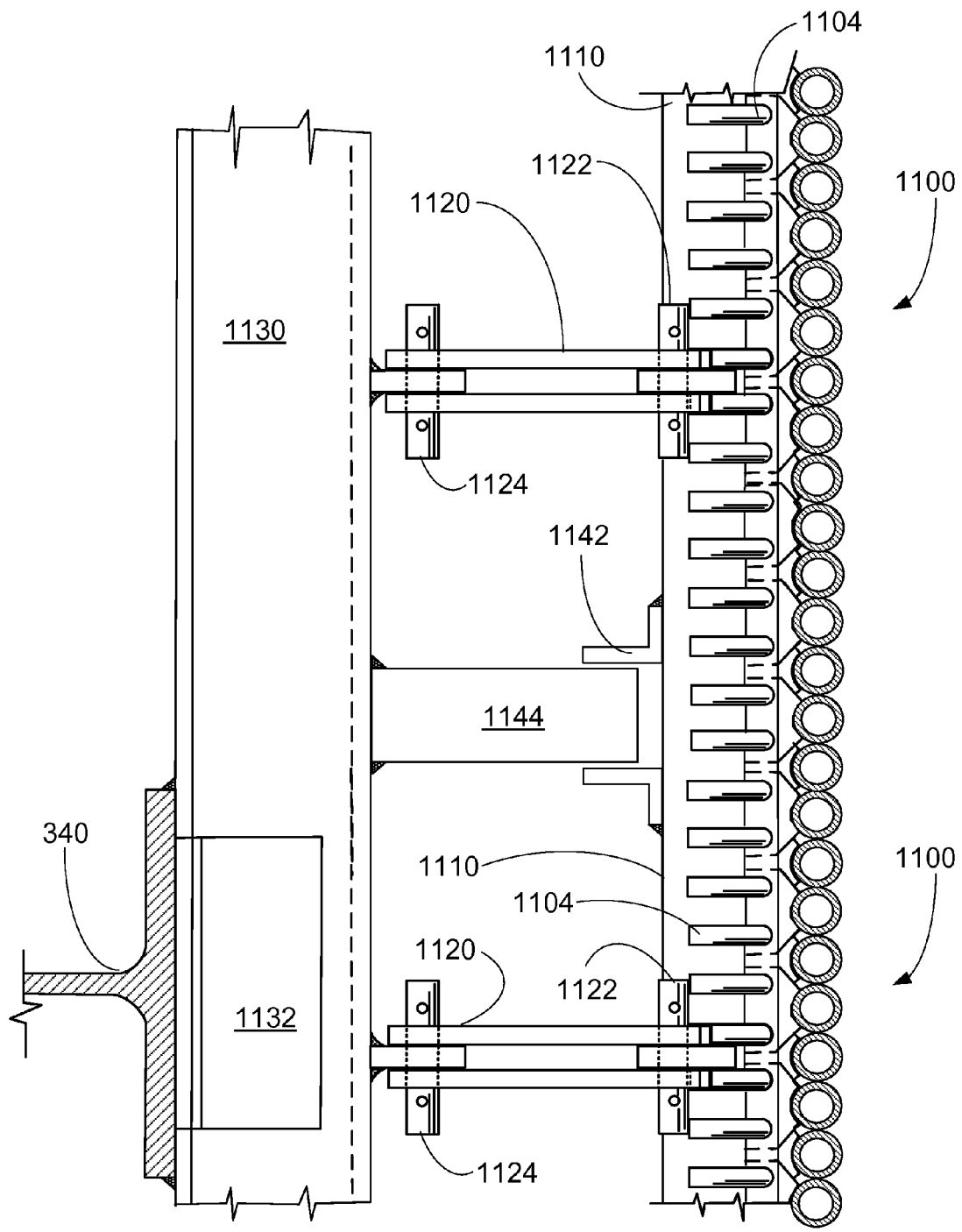
FIG. 12 is a plan view of some portions of a toggling buckstay support system used to connect facets or tube panels to the support structure.
Figure 13:
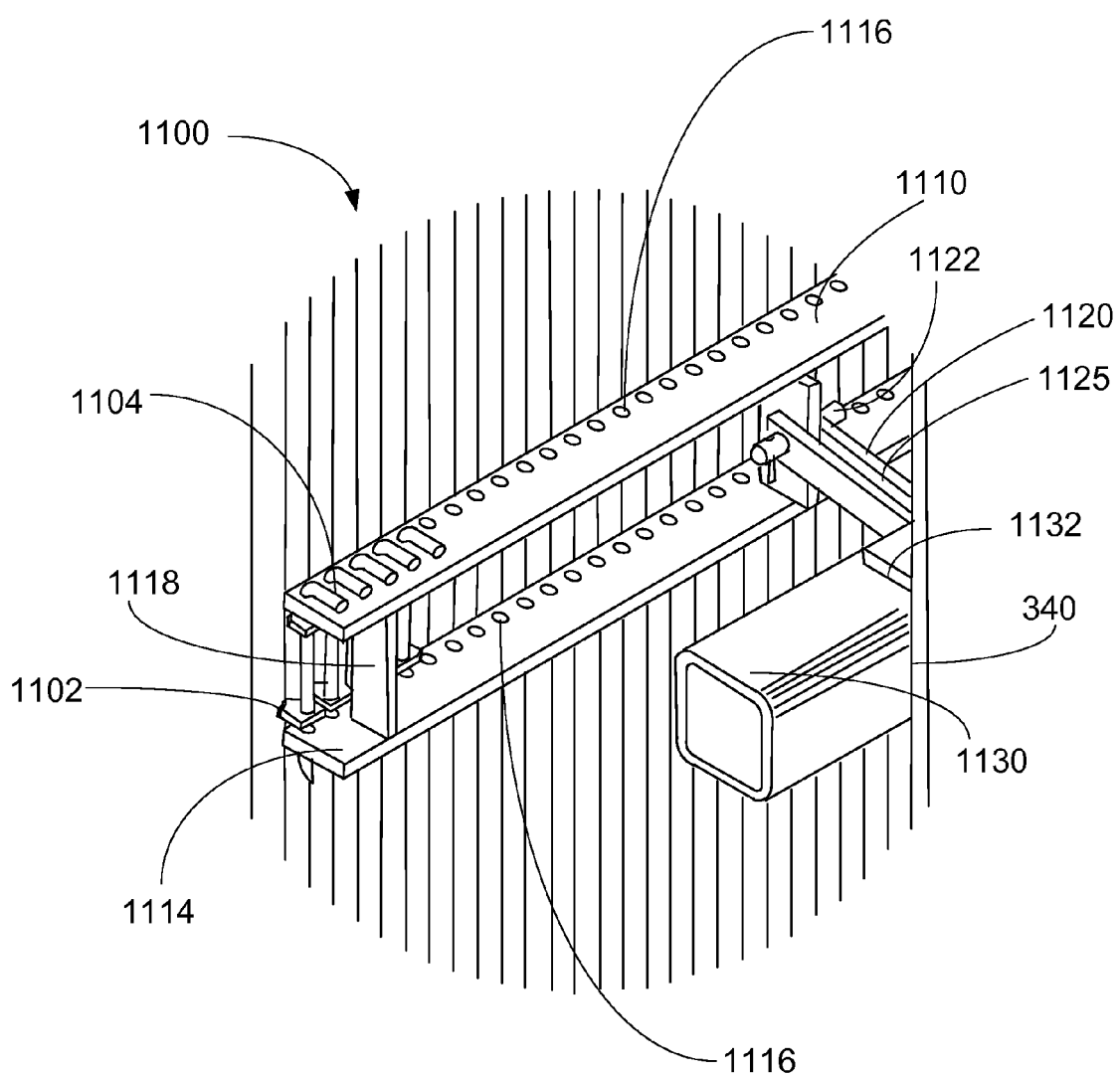
FIG. 13 is a perspective view of some portions of a toggling buckstay support system used to connect facets or tube panels to the support structure.

Since the solar receiver is shop-assembled, and will be transported horizontally (see FIG. 14) and then erected into a vertical position, it is important to provide for adequate support of the tangent tube panels during and in between both conditions. More specifically, it is necessary to provide for a non-typical level of support which addresses concerns due to shipping the receiver and locating the receiver in a high seismic zone, accommodates for all anticipated thermal expansions, enforces the appropriate tube spacing to insure a "light tight" construction, supports manufacturability, and supports field replacement should that become necessary. The tangent tube support system must provide for adequate support of the tube panels. Some views of the buckstay system are illustrated in FIG. 11, FIG. 12, and FIG. 13. FIG. 11 is a side cross-sectional view, FIG. 12 is a plan view, and FIG. 13 is a perspective view.

As illustrated here, partially circumferentially welded tube lugs 1102 are employed on each tube of a tube panel 1100, and wherein each lug 1102 is located on adjacent tubes at offset elevations with clearances to accommodate for both manufacturing considerations and expected tube-to-tube temperature differentials. As shown in FIG. 13, the tube lugs 1102 are each provided with two apertures which accept pins 1104 to provide a two-pinned connection to a collector beam assembly 1110 comprised of upper and lower collector beams 1114 which are each provided with corresponding apertures 1116 for accepting the pins 1104, and interconnecting plates 1118. This embodiment thus supports a panel comprised of n tubes by implementing (n+1) intermediately located pins 1104, where n is an integer representing the number of tubes in a panel. Therefore while in many ways advantageous to a single pin support location (per lug) design, this effect is still similarly accomplished by implementing a single lug per tube and approximately a single pin per tube (when considering overall quantities required for manufacturing). The clearances between the tube lugs 1102 and collector beam assembly 1110 again accommodate for both manufacturing considerations and expected tube-to-tube temperature differentials.

Two interconnecting plates 1118 per supported tube panel are connected via pins 1122, 1124 and rotating link bars 1120 to a link bar support lug 1125 which is attached to a flexural support member 1130 via structural steel 1132 to the columns comprising the vertical support structure 340. Through the aforementioned system, forces acting on each tube in a direction perpendicular to the plane defined by the tube panel can be efficiently supported by structural steel. Additionally the rotating link bars 1120 purposefully allow for rotation and thus accommodate for the average thermal expansion of the supported tube panels as a whole; the rotating link bars 1120 in this embodiment will typically be ½ preset for this thermal expansion. Two collector beam assembly support lugs 1140 are located per supported tube panel in the appropriate locations so that the collector beam assembly 1110 travels at the panel's average thermal expansion while also providing a load path for vertical dead load of the assembly, light barrier, insulation, and lagging to be efficiently supported by the structural steel.

As seen in FIG. 11, bumper guides 1142 are affixed to the center (considering the header axial direction) of the collector beam assembly 1110 and a cantilevered bumper 1144 is attached to the flexural support member 1130, which again is attached via structural steel 1132 to the columns of the vertical support structure 340. Through the aforementioned system, forces acting on each tube in the header axial direction can be efficiently supported by the structural steel while allowing for the appropriate tube panel thermal expansions. Additionally the bumper system provides a centrally located anchor point for thermal expansion in the header axial direction. While the primary function of the buckstay system is to adequately support the tangent tube panels for all expected loading conditions while still allowing for the appropriate thermal expansions, there are a number of other advantages realized through the use of this approach. First, the collector beam assembly offers a convenient shelf on which to locate a light barrier, insulation, and lagging. Second, the collector beam assembly reduces costs and facilitates shop manufacture. Manufacturing and assembling the tube lugs 1102, pins 1104, collector beams 1114, and interconnecting plates 1118 yields a convenient fixture that assists in the manufacturing process. The fixture is temporarily affixed to a tube panel assembly at the appropriate elevation and the individual tube lugs 1102 are tack welded in place. Upon removal of the fixture the tube lug 1102 welding process is finalized providing a fitted tube panel to collector beam assembly.

The pin 1122 and link bar 1120 system supports field replacement. The tube panels can be completely detached from the vertical support structure (when considering a single tube panel) by removing the relevant header/piping connections, disconnecting two header vertical support rods, and disconnecting the two pins 1122 more proximal to the support structure at each tangent tube support elevation. As they presumably reside outside of the light barrier, insulation, and lagging the proposed invention offers a convenient method to remove tube panels for field replacement.

The element of this embodiment that remains regardless of the aforementioned design is the partially circumferentially welded tube lug 1102 design located on offset elevations that each provides two pinned 1104 support locations allowing (n+1) intermediately located pins to support a n tangent tube panel.

Referring to FIG. 13, the collector beam assembly 1110 could be comprised of different structural shapes, if desired. For example, instead of the pair of long rectangular bars forming each of the collector beams 1114, which may flex or bow with gravity, the collector beams 1114 could be comprised of 90 degree angles which are stiffer. The apertures 1116 provided through one of the legs of each angle are then more likely to be aligned with the apertures in the lugs 1102, facilitating installation of the pins 1104. The other legs of the angles would be oriented towards the vertical support 340. Alternatively, a single structural T shape, where the stem of the T is located between the offset tube lugs 1102 and the apertures 1116 for receiving the pins 1104 are provided therein, and the bar of the T is oriented towards the vertical support 340, may be employed.

The cantilevered hollow structural shape (HSS) bumper 1144 and HSS flexural support member 1130 could be similarly accomplished utilizing W or other structural shapes. This would allow more typical attachments to structural steel and should more readily allow the tangent tube support system's flexural support member 1130 to serve additional purposes in the structural steel. The various components can be fabricated from carbon steel, or other materials such as stainless steel or other alloy steels.

Figure 14:
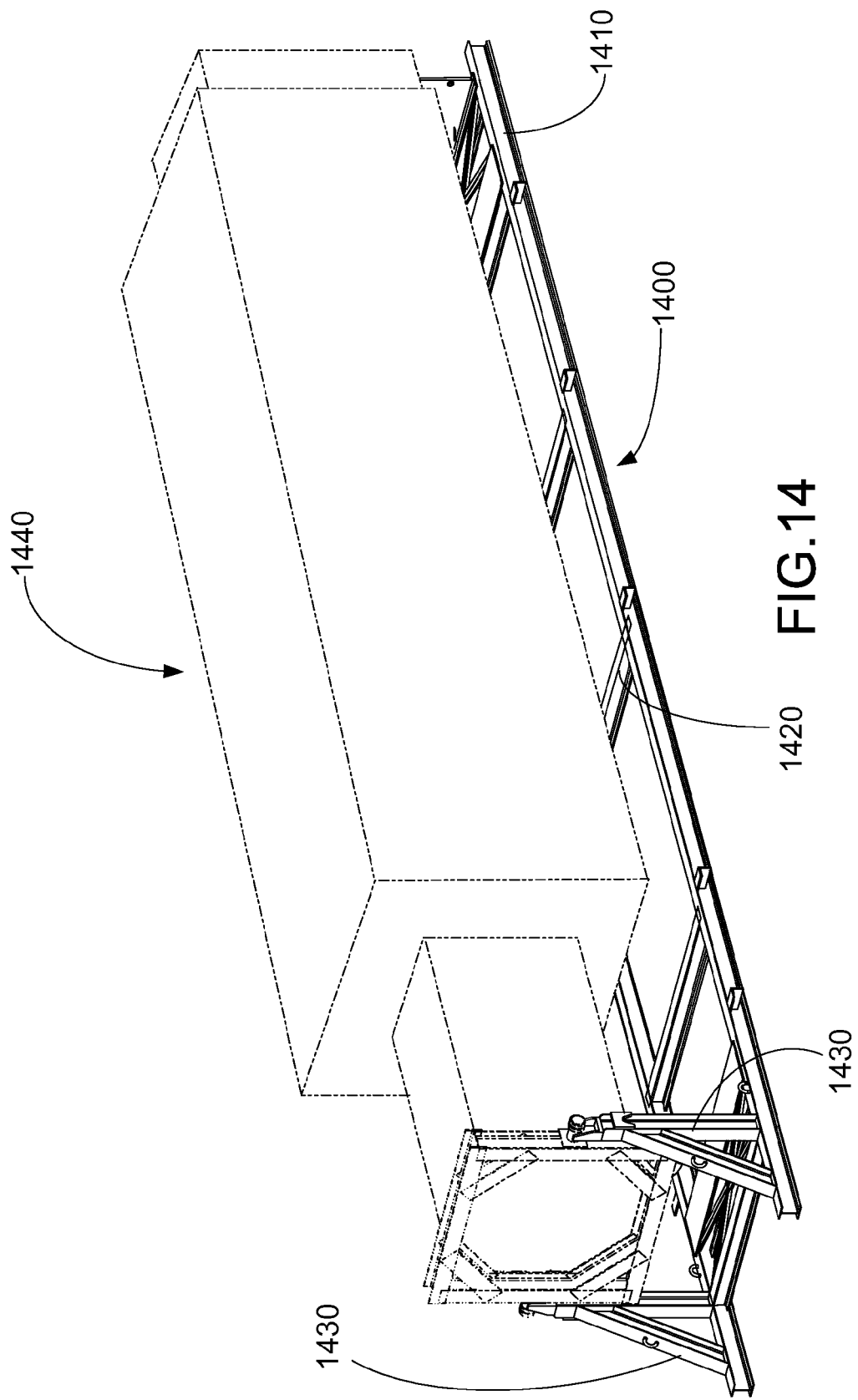
FIG. 14 is a perspective view of a fixture upon which the solar receiver is shop-assembled, shipped and lifted.

Referring now to FIG. 14, the solar receiver can be shipped using a shipping fixture 1400. In addition to serving as the transportation rig, the shipping fixture is also used to shop-assemble the solar receiver, and it ensures proper lifting when up-righting the receiver in the field which prevents receiver damage. The shipping fixture is constructed from a series of beams 1410 and rails 1420 that form a base structure upon which the solar receiver is shipped. Braces 1430 are present on one end of the shipping fixture to support the bottom end of the solar receiver (reference numeral 1440).

Referring back to FIG. 4, a crane 344 is located at the top or peak of the solar receiver to facilitate tube or panel replacement. An access platform 306 is present at the bottom of the facets/tube panels, and another access platform is present above the facets/tube panels. Platforms may also be located at each buckstay elevation.

FIG. 16 is an enlarged view of the top of the support structure 340. Two maintenance beams 600, 602 are attached to the structural steel of the support structure 340 located above the solar receiver. For reference, the upper heat shield 394 is visible. Hinges connect the maintenance beam to the support structure. These maintenance beams are used to support a sky climber from grade in order to access the exterior of the facets/tube panels for inspections or repairs.

FIGS. 17A-17D are views illustrating the use of the maintenance beams in various positions. FIG. 17A is a perspective view showing only the maintenance beams, and the arc in which they can pivot. Two maintenance beams 600, 602 are illustrated, with one beam being the mirror image of the other. Each maintenance beam, as illustrated here, is formed from a long bottom arm 610 and an angled top arm 620. One end of each arm is placed between two plates 630. The plates have three holes, set to form three corners of a square. One of the holes 632 receives a hinge pin 640 and acts as the pivot about which the maintenance beam can pivot. This hole 632 is along a center line of the plate. The other two holes 634, 636 are used to receive a lock pin 650 to lock the maintenance beam in one of three positions, and can be considered as lock holes. Plate lock hole 634 is located in a central region of the plate. Plate hinge hole 632 is along a center line and an edge of the plate. Plate lock hole 636 is located in a corner of the plate along the same edge as plate hinge hole 632. Each maintenance beam can pivot about an arc of at least 180°. The bottom arm 610 contains three holes in a line, with the hinge pin being located in the center hole of the bottom arm. In this figure, the maintenance beams are in a stowed position against the support structure.

FIG. 17B is a plan view showing the plate 630 and the bottom arm 610 of the maintenance beam 600 in the stowed position. The plate 630 extends from the support structure 340. The three holes in the bottom arm 610 can be seen here. Referring to FIG. 17A as well, the lock pin is inserted through plate lock hole 636 and bottom arm hole 614. The hinge pin is inserted through plate hole 632 and bottom arm hole 612. Bottom arm hole 616 and plate lock hole 634 are empty. The bottom arm hole 616 is proximal to the end of the arm 610.

FIG. 17C is a plan view showing the maintenance beam 600 in the second service position. The maintenance beam extends away from the support structure beyond the tube panels in one flow quadrant. Referring to FIG. 17A as well, the lock pin 650 is inserted through plate lock hole 636 and bottom arm hole 616. Bottom arm hole 614 and plate lock hole 634 are empty.

FIG. 17D is a plan view showing the maintenance beam 600 in the first service position. The maintenance beam extends away from the support structure beyond the tube panels in a different flow quadrant from that of FIG. 17C. Referring to FIG. 17A as well, the lock pin 650 is now inserted through plate lock hole 634 and bottom arm hole 616. Bottom arm hole 614 and plate lock hole 636 are empty.

It should be noted that although FIGS. 17B-17D illustrate only the positions of the lock pins for the bottom arm 610, as seen in FIG. 17A it is contemplated that lock pins 650 and hinge pins 640 are also used with the top arm 620.

The solar receiver will include instrumentation to measure tube hot face and fluid temperatures, heat flux on panels and possibly strain, deflection and thermal expansion of various components of the receiver, as well as other desired measurements. This instrumentation is not specifically drawn and called out.

It will thus be appreciated that the present disclosure provides a thermally and cost-effective solar receiver design having the following properties. The design is low cost, and capable of being shop-assembled in a mass-production environment. Its size permits truck shipment within normal limits for truck shipment (truck width <13 ft, overall height <12'6", overall length <35 ft.). The relatively low weight reduces shipping and erection costs. The solar receiver is designed for high reliability and long life while operating under highly cyclic operating conditions, and is capable of withstanding daily startups, shutdowns and cloud transients without suffering low cycle fatigue damage.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A modular molten salt solar receiver, comprising:
four heat transfer facets, each facet comprising an inlet, an outlet, and multiple tube panels, each tube panel comprising at least one tube, an inlet header, and an outlet header;
the four facets being arranged on an exterior of a support structure to form a NE flow quadrant, a NW flow quadrant, a SE flow quadrant, and a SW flow quadrant that are each defined by a single facet, the tube panels in each facet being oriented to locate the headers in an upper plane and a lower plane, wherein the headers in each plane are laterally separated from each other, and wherein the facets are fluidly connected so as to form two independent flow paths, one flow path including only the NE flow quadrant and the SW flow quadrant, and the other flow path including only the NW flow quadrant and the SE flow quadrant; and
further including an upper heat shield enclosing the headers of the tube panels in the upper plane, a lower heat shield enclosing the headers of the tube panels in the lower plane, an upper oven box enclosed by the upper heat shield, and a lower oven box enclosed by the lower heat shield.

2. The solar receiver of claim 1, wherein the solar receiver is shop assembled and truck shippable.

3. The solar receiver of claim 1, wherein the headers of each tube panel on the solar receiver are inward facing.

4. The solar receiver of claim 1, wherein the upper headers and the lower headers of one facet are at a higher elevation than the upper headers and the lower headers of an adjacent facet.

5. The solar receiver of claim 1, wherein the facets are arranged in a rectangular or square configuration.

6. The solar receiver of claim 1, further comprising an outlet vessel, the outlet vessel being fluidly connected downstream of the tube panels.

7. The solar receiver of claim 1, further comprising an inlet vessel, the inlet vessel being fluidly connected upstream of the tube panels.

8. The solar receiver of claim 1, wherein each tube panel is top supported and connected to the support structure along a height of the tube panel by a toggling buckstay support system.

9. A modular molten salt solar receiver, comprising:
four heat transfer facets, each facet comprising an inlet, an outlet, and multiple tube panels, wherein each tube panel comprises a plurality of tubes, an upper header, and a lower header, the tubes forming a body that is wider than the upper header and the lower header, with the body extending beyond the lateral ends of the upper header and the lower header;
the four facets being arranged on an exterior of a support structure to form a NE flow quadrant, a NW flow quadrant, a SE flow quadrant, and a SW flow quadrant that are each defined by a single facet, wherein the facets are fluidly connected so as to form two independent flow paths, one flow path including only the NE flow quadrant and the SW flow quadrant, and the other flow path including only the NW flow quadrant and the SE flow quadrant; and
further including an upper heat shield enclosing the upper headers of the tube panels, a lower heat shield enclosing the lower headers of the tube panels, an upper oven box enclosed by the upper heat shield, and a lower oven box enclosed by the lower heat shield.

10. The solar receiver of claim 9, wherein the ratio of the body width to the width of the lower header or the upper header is at least 1.05:1.

11. The solar receiver of claim 9, wherein the headers of each tube panel on the solar receiver are inward facing.

12. The solar receiver of claim 9, wherein the upper headers and the lower headers of one facet are at a higher elevation than the upper headers and the lower headers of an adjacent facet.

13. The solar receiver of claim 9, further comprising:
an inlet vessel; and
inlet piping that fluidly connects the inlet vessel to two adjacent flow quadrant facet inlets.

14. The solar receiver of claim 13, further comprising an outlet vessel located above the tube panel upper headers, and outlet piping that fluidly connects the outlet vessel to two adjacent flow quadrant facet outlets.

15. The solar receiver of claim 13, further comprising a downcomer pipe, and outlet piping that fluidly connects two adjacent flow quadrant facet outlets to the downcomer pipe.

16. The solar receiver of claim 13, further comprising a riser pipe and a bypass line, the riser pipe leading to the inlet vessel and the bypass line connecting the riser pipe to a downcomer pipe.

17. A molten salt solar power system, comprising:
a vertical support structure;
a central solar receiver located on the vertical support structure that comprises:
four facets, each facet comprising multiple tube panels, each tube panel comprising a plurality of tubes, an upper header, and a lower header, the tubes forming a body that is wider than the upper header and the lower header, an upper heat shield enclosing the upper headers of the tube panels, a lower heat shield enclosing the lower headers of the tube panels, an upper oven box enclosed by the upper heat shield, and a lower oven box enclosed by the lower heat shield;
the four facets being arranged on an exterior of a support structure to form a NE flow quadrant, a NW flow quadrant, a SE flow quadrant, and a SW flow quadrant that are each defined by a single facet, wherein the tube panels are fluidly connected so as to form two independent flow paths, one flow path including only the NE flow quadrant and the SW flow quadrant, and the other flow path including only the NW flow quadrant and the SE flow quadrant;
a plurality of heliostats arranged around the vertical support structure;
a cold storage tank configured to supply molten salt to the central solar receiver; and
a hot storage tank configured to receive molten salt from the central solar receiver.

18. The molten salt solar power system of claim 17, further comprising a steam generation system that receives molten salt from the hot storage tank.

19. The molten salt solar power system of claim 17, wherein the power system includes a plurality of vertical support structures, a central solar receiver being located on each vertical support structure.

20. The molten salt solar power system of claim 17, wherein the headers of each tube panel on the solar receiver are inward facing.

21. The molten salt solar power system of claim 17, wherein the upper headers and the lower headers of the tube panels in one flow quadrant are at a higher elevation than the upper headers and the lower headers of the tube panels in an adjacent flow quadrant.

22. The molten salt solar power system of claim 17, wherein the ratio of the body width to the width of the lower header or the upper header is at least 1.05:1.

23. The molten salt solar power system of claim 17, wherein the upper header and the lower header are biased to one side of a plane formed by the plurality of tubes.

\* \* \* \* \*